United States Patent [19]
Watanabe et al.

[11] Patent Number: 5,479,576
[45] Date of Patent: Dec. 26, 1995

[54] NEURAL NETWORK LEARNING SYSTEM INFERRING AN INPUT-OUTPUT RELATIONSHIP FROM A SET OF GIVEN INPUT AND OUTPUT SAMPLES

[75] Inventors: Sumio Watanabe; Kenji Fukumizu, both of Yokohama, Japan

[73] Assignee: Ricoh Company, Ltd., Tokyo, Japan

[21] Appl. No.: 393,024

[22] Filed: Feb. 23, 1995

Related U.S. Application Data

[63] Continuation of Ser. No. 11,492, Jan. 29, 1993, abandoned.

[30] Foreign Application Priority Data

| Jan. 30, 1992 | [JP] | Japan | 4-040225 |
| Feb. 5, 1992 | [JP] | Japan | 4-054210 |
| Feb. 5, 1992 | [JP] | Japan | 4-054218 |
| Apr. 17, 1992 | [JP] | Japan | 4-125749 |
| Oct. 5, 1992 | [JP] | Japan | 4-290707 |

[51] Int. Cl.$^6$ ........................ G06F 15/18
[52] U.S. Cl. ............... 395/23; 395/21; 364/130
[58] Field of Search ............... 395/21, 23, 24; 364/130, 275

[56] References Cited

U.S. PATENT DOCUMENTS

| 4,885,757 | 12/1989 | Prorence | 375/96 |
| 4,937,872 | 6/1990 | Hopfield et al. | 381/43 |
| 4,945,494 | 7/1990 | Penz et al. | 395/23 |

OTHER PUBLICATIONS

A Non Competitive Model for Unsupervised Learning T. Hrycej IEEE/16–18 Oct. 1989.
Maximum Likelihood Density Estimation by means of PDF Network Jian–xiong Wu et al. IEEE/Sep. 1990.
An Application of Neural Net Technology to Surveillance Information Correlation and Battle Outcome Prediction P. Suzie Maloney, PhD, IEEE/22–26 May 1989.
A Learning Algorithm for Boltzman Machines D. H. Ackley Dec. 31, 1985.
C. H. Anderson et al., "A Bayesian Probability Network", *American Institute of Physics Proceedings*, Snowbird, Utah, 1986, pp. 6–11.
P. Susie Maloney et al., "The Use of Probabilistic Neural Networks to Improve Solution Times for Hull–to–Emitter Correlation Problems", *IJCNN International Joint Conference on Neural Networks*, Sheraton Washington Hotel, Washington, D.C., Jun. 1989, pp. I–289 through I–294.
Gerhard Paass, "Structured Probabilistic Neural Networks", *Neuro–Nimes '89 International Workshop Neural Networks & Their Applications*, Nimes, France, Nov. 1989, pp. 345–359.
Nasser M. Nasrabadi et al., "Vector Quantization of Images Based Upon the Kohonen Self–Organizing Feature Maps", *IEEE International Conference on Neural Networks*, San Diego, California, Jul. 1988, pp. I–101 through I–108.
Donald F. Specht, "Probabilistic Neural Networks for Classification, Mapping, or Associative Memory", *IEEE International Conference on Neural Networks*, San Diego, California, Jul. 1988, pp. I–525 through I–532.
"A General Regression Neural Network", by Donald F. Specht from IEEE transactions on neural networks, vol. 2, No. 6, Nov. 1991.

*Primary Examiner*—Allen R. MacDonald
*Assistant Examiner*—Richemond Dorvil
*Attorney, Agent, or Firm*—Popham, Haik, Schnobrich & Kaufman, Ltd.

[57] ABSTRACT

A neural network learning system in which an input-output relationship is inferred. The system includes a probability density part for determining a probability density on a sum space of an input space and an output space from a set of given input and output samples by learning, the probability density on the sum space being defined to have a parameter, and an inference part for inferring a probability density function based on the probability density from the probability density part, so that an input-output relationship of the samples is inferred from the probability density function having a parameter value determined by learning, the learning of the parameter being repeated until the value of a predefined parameter differential function using a prescribed maximum likelihood method is smaller than a prescribed reference value.

27 Claims, 20 Drawing Sheets

NEURAL NETWORK LEARNING SYSTEM INFERRING AN INPUT-OUTPUT RELATIONSHIP FROM A SET OF GIVEN INPUT AND OUTPUT SAMPLES

This is a continuation of U.S. patent application Ser. No. 08/011,492, filed Jan. 29, 1993, now abandoned.

BACKGROUND OF THE INVENTION

The present invention generally relates to a neural network learning system, and more particularly to a neural network learning system in which a neural network model based on a unified theory using mathematical statistics is constructed and used. By the unified theory, conventional neural networks such as Boltzmann machine and function approximation neural networks (FANN) are generalized, and the disadvantages of the conventional neural networks are eliminated.

Recently, applications of neural networks to pattern recognition, voice recognition, robotic control and other techniques have been studied, and it is recognized that the neural network applications are very useful in those field. In the prior art, a known neural network learning system obtains an input-output relationship by taking given inputs and desired outputs corresponding to the given inputs, so that learning of a neural network is performed in accordance with the input-output relationship.

FIG. 1 shows an input-output relationship which is inferred by a conventional neural network learning system of the type as described above. In the neural network learning system shown in FIG. 1, an input-output relationship is inferred from a set of given input and output samples [(xi, yi); i=1, 2, ..., N]. A parameter w, which satisfies the function y=φ(w, x) indicating the input-output relationship with the maximum likelihood, is obtained. In other words, the output y (=φ(w, x)) in accordance with the input-output relationship is obtained from the given teaching data [(xi, yi)] in the conventional neural network learning system.

However, the learning performed by the conventional neural network learning system described above relates to correspondence between one input and one output only. Generally, the known neural networks, such as the Boltzmann machine or the FANN, cannot estimate the variance of outputs, cannot deal with the learning with respect to correspondence between one input and multiple outputs, and cannot judge whether a given input is known or unknown. Also, in the above described learning system, it is impossible to obtain an input for a given output in accordance with the inferred input-output relationship in the reverse manner. Also, it is impossible to estimate the reliability of the output y obtained through the above described inference.

SUMMARY OF THE INVENTION

Accordingly, it is a general object of the present invention to provide an improved neural network learning system in which the above described problems are eliminated.

Another, more specific object of the present invention is to provide a neural network learning system which obtains many kinds of information from the neural network, enough to judge whether or not an output actually takes place for a given input, and increases flexibility with respect to the learning of the neural network. The above mentioned object of the present invention is achieved by a neural network learning system which comprises a probability density part for determining a probability density on a sum space of an input space and an output space from a set of given input and output samples by learning, the probability density on the sum space being expressed by a parameter, and an inference part for inferring a probability density function based on the probability density from the probability density part, so that an input-output relationship of the samples is inferred from the probability density function having a parameter value determined by learning, the learning of the parameter being repeated by the inference part until a value of a predefined parameter difference function using a prescribed maximum likelihood method is smaller than a prescribed reference value.

According to the learning system of the present invention, it is possible to realize an arbitrary multi-valued function with respect to the posterior probability. It is also possible to determine whether a given input is known or unknown. Further, it is possible to obtain a set of input values in response to a given output value. These capabilities of the learning system of the present invention can realize neural network communication resembling human communication.

Still another object of the present invention is to provide a neural network learning system in which the clustering of teaching data is performed by using either a non-hierarchical classifying technique or a hierarchical classifying technique.

A further object of the present invention is to provide a data analyzing device used in the neural network learning system mentioned above in which the optimal clustering of data is performed even if the items of data of clusters have different configurations.

Other objects and further features of the present invention will become apparent from the following detailed description when read in conjunction with the accompanying drawings.

DESCRIPTION OF THE PREFERRED EMBODIMENTS

Figure 1:
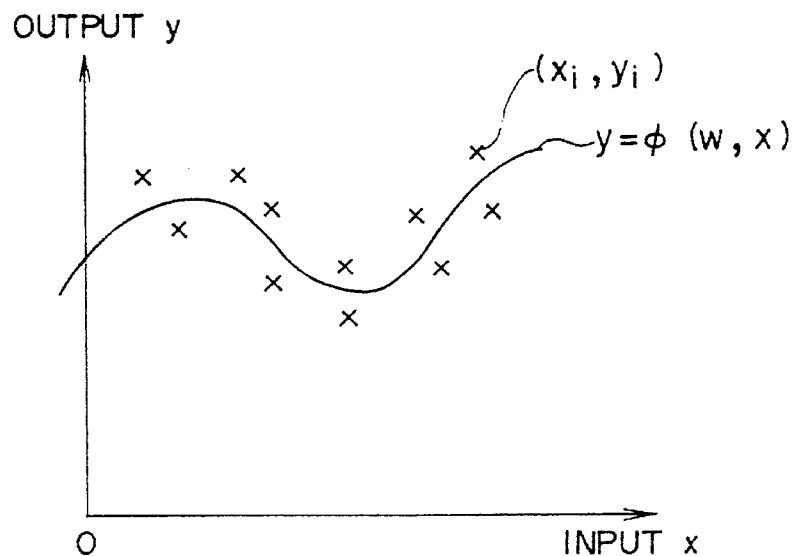
FIG. 1 is a diagram showing an input-output relationship inferred by a conventional neural network learning system.
Figure 2:
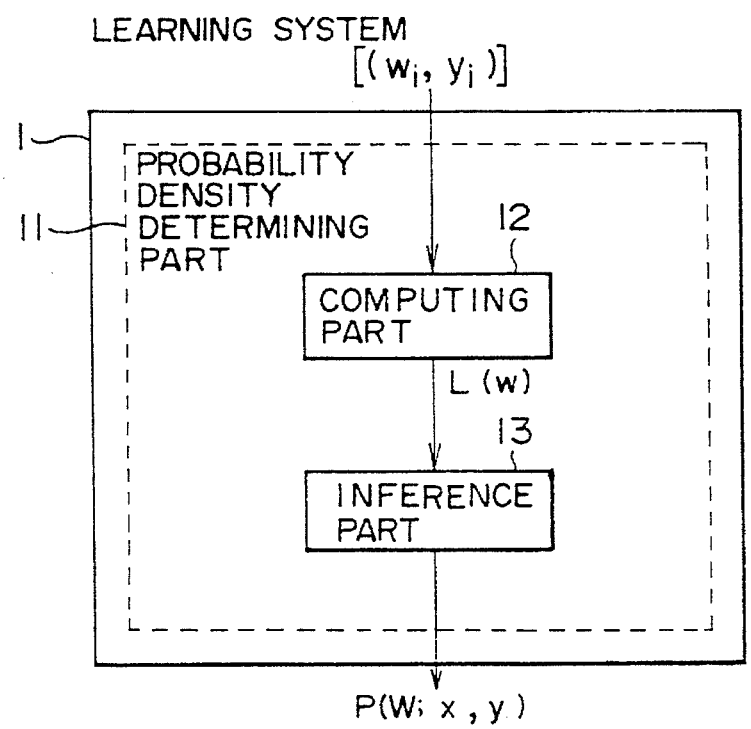
FIG. 2 is a block diagram showing a first embodiment of a neural network learning system according to the present invention.

A description will now be given of a first embodiment of a neural network learning system (hereinafter called the learning system) according to the present invention, with reference to FIG. 2. A neural network learning system 1 of this embodiment, as shown in FIG. 2, includes a probability density determining part (hereinafter called the determining part) 11 for inferring and obtaining a probability density of an input-output relationship through learning. The determining part 11 has a computing part 12 and an inference part 13, as shown in FIG. 2.

In the first embodiment of the learning system shown in FIG. 2, it is assumed that Sx is an input space on which an input vector x is defined, and that Sy is an output space on which an output vector y is defined. A neural network is defined to be a probability density function P(w; x, y) on the sum space A=Sx+Sy according to the present invention. The probability density function P(w; x, y) on the sum space A is expressed by a parameter w, the input vector x, and the output vector y. The determining part 11 infers a probability density from the set of given input and output samples [(xi, yi)] by learning, and obtains the probability density function P(w; x, y) on the space A defined by the parameter w being learned through a prescribed maximum likelihood method.

More specifically, in order to infer and obtain a probability density function P(w; x, y) on the sum space A, the computing part 12 computes probabilities L(w) for the set of given input and output samples [xi, yi] (i=1, 2, ..., N). By applying the maximum likelihood method to the probabilities L(w) obtained by the computing part 12, the inference part 13 infers a probability density from the probabilities L(w) of the samples, and outputs a probability density function P(w; x, y) defined by the parameter w obtained through the maximum likelihood method.

Figure 3:
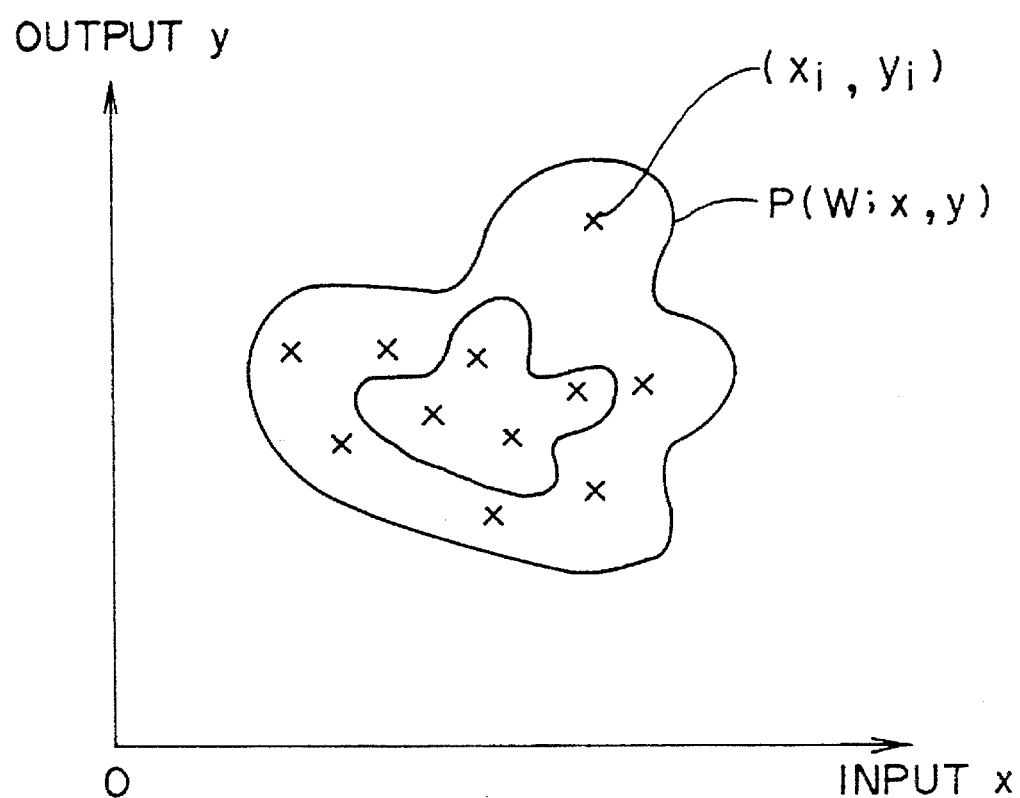
FIG. 3 is a diagram for explaining a probability density function on the sum space with respect to input and output vectors when the function has a parameter.

Next, the operation performed by the learning system 1 of the first embodiment will be described. A set of given input and output samples [(xi, yi)] is a set of points, indicated by cross marks shown in FIG.3, lying on the sum space A. It is assumed that the samples are distributed on the sum space A in accordance with the probability density function P(w; x, y). The probability L(w) for the set of given input and output samples [(xi, yi)] is represented as follows.

$$L(w) = \prod_{i=1}^{N} P(w; x_i, y_i) \quad (1)$$

"L(w)" in formula (1) is the likelihood function with respect to the parameter w, and the parameter w can be determined from the probability L(w) having the maximum value. The logarithm function (=log(x)) monotonously increases or decreases when the variable x increases or decreases. Determination of the parameter w from the logarithm of the probability L(w) having the maximum value is equivalent to determination of the parameter w from the probability L(w) having the maximum value. Thus, the parameter w is determined from the logarithm of the probability L(w) having the maximum value. The maximum value of the logarithm of the probability L(w) can be obtained by finding a value of the parameter w when the value of the parameter differential dw is smaller than a predetermined reference value "E", through the maximum likelihood method.

When the maximum likelihood method described above is applied to the probability L(w), $$dw = \partial \log L(w)/\partial w = (1/L(w)) \cdot (\partial L(w)/\partial w) = \quad (2)$$

$$\sum_{i=1}^{N} (1/P(w; x_i, y_i)) \times (\partial P(w; x_i, y_i)/\partial w)$$

By applying the maximum likelihood method using the above formula (2), the parameter w corresponding to the probability L(w) having the maximum value can be determined. The probability L(w) has the maximum value when the parameter differential dw according to formula (2) is smaller than the value "E", and the parameter w where the required condition is satisfied is determined to be the parameter w corresponding to the probability L(w) having the maximum value.

By using the above formula (2), it is possible to determine the parameter w corresponding to the probability L(w) having the maximum value on the sum space for the set of given input and output samples. Thus, the inference part 13 infers and obtains the probability density function P(w; x, y) having the parameter w from the probability L(w) of the computing part 12 in accordance with the above formula (2).

Figure 4:
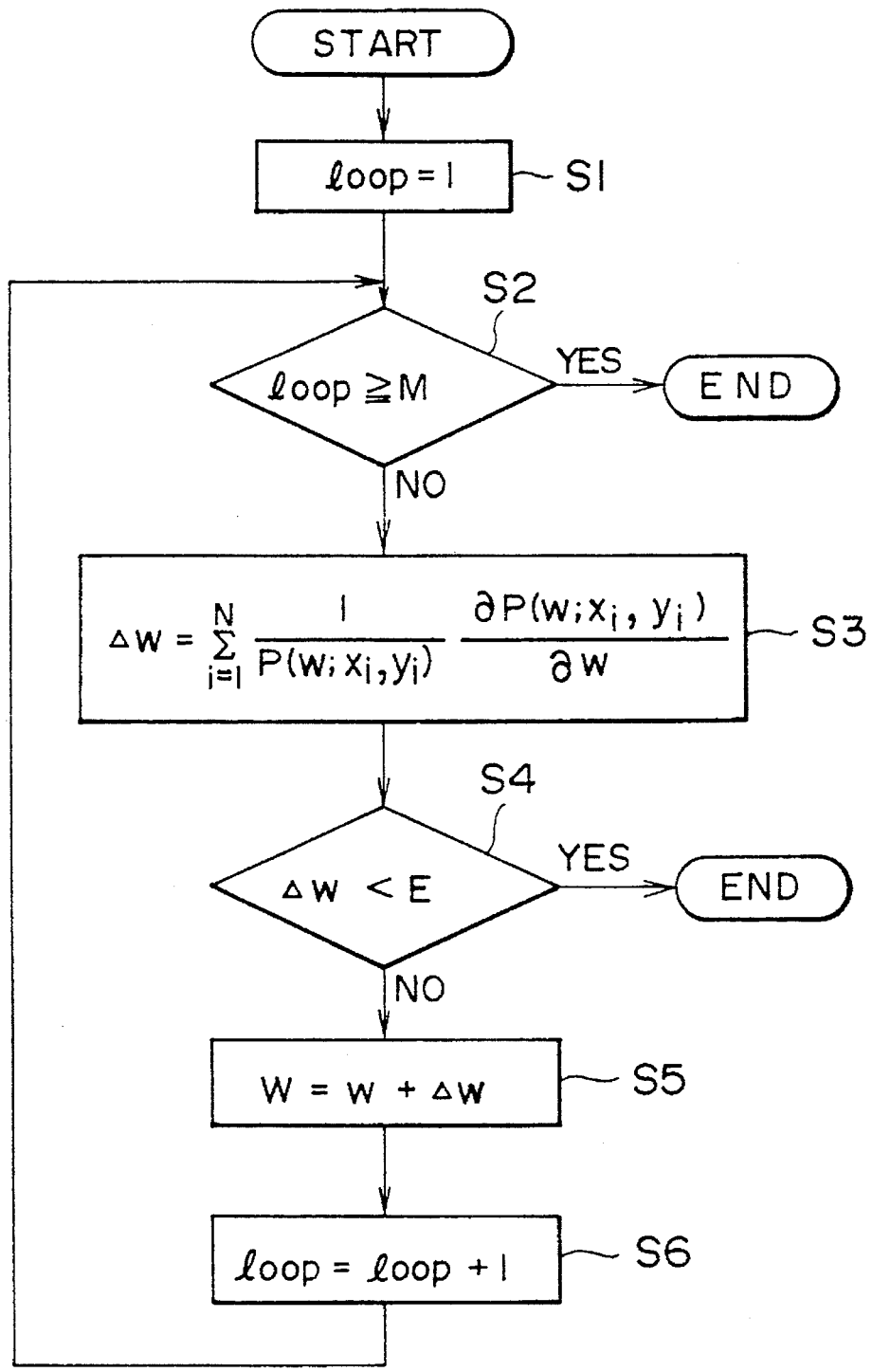
FIG. 4 is a flow chart for explaining a learning process performed by the learning system shown in FIG. 2.

FIG. 4 shows a learning process performed by the learning system of the present invention in accordance with the above described learning rule. In this process, a maximum number "M" of iterations of this routine for a set of given input and output samples [(xi, yi)] is predetermined. The value of the parameter differential dw is compared with a predetermined reference value "E" to judge whether or not the learning of the parameter w is completed.

In the flow chart shown in FIG. 4, step S1 initially sets a count number "loop" to 1. Step S2 detects whether or not the count number "loop" has reached the maximum repetition number M by comparing the count number "loop" with the number M. When the count number "loop" has reached the number M, the process ends. The subsequent steps S3 through S6 are repeated until the count number "loop" has reached the number M.

Step S3 computes the value of the parameter differential dw from the set of given input and output samples [(xi, yi)] according to the above formula (2). Step S4 detects whether or not the value of the parameter differential dw is smaller than the reference value "E".

When the parameter differential dw is not smaller than the reference value "E", the next steps S5 and S6 are taken. Step S5 increments the parameter w by the parameter differential dw. Step S6 increments the count number "loop" by one. Then, the steps S2 to S6 are repeated.

When the dw is smaller than the value "E" in step S4, it is determined that the learning for the samples is completed, the determining part 11 outputs the probability density P(w; x, y) on the sum space A (the probability density P having the value of the parameter w at this time), and the learning process ends.

In the forgoing description, there is no example of the probability density function on the sum space A with the parameter w. In order to embody a neural network model according to the present invention, the following function is used as an example of the probability density function on the sum space A with the parameter w:

$$P(w; x, y) = \sum_{h=1}^{H} C_h \exp(-\phi(w_h; x, y)) \quad (3)$$

where $\phi$ (wh; x, y) is an arbitrary function indicating the relationship between the parameter w and the input and output vectors x and y.

Figure 5:
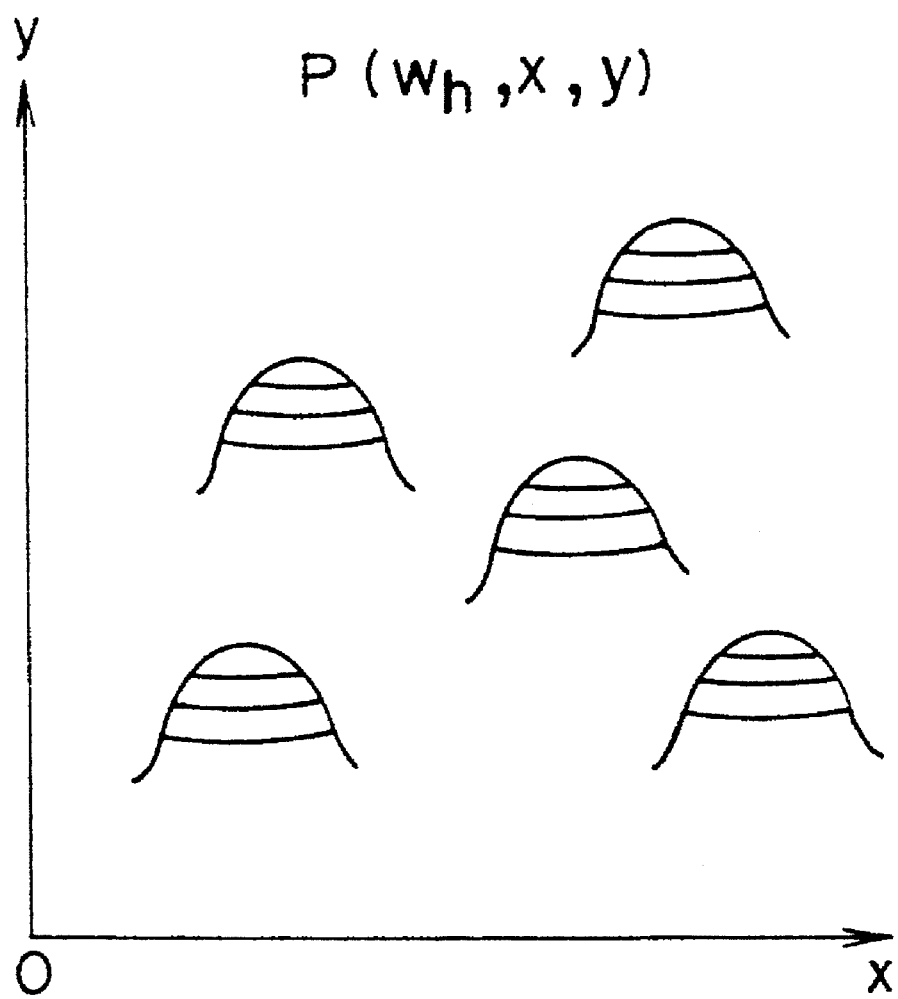
FIG. 5 is a diagram showing the distribution of the probability density when an exponential function is used.

The probability density function P(w; x, y) of formula (3) indicates the linear combination of the values of the exponential function "exp ($-\phi$ (wh; x, y))". FIG. 5 shows a probability distribution of the probability density P(w; x, y) when the exponential function according to the above formula (3) is used. In the above first embodiment, the function $\phi$ (wh; x, y) indicating the relationship between the parameter w and the input and output vectors x and y can be used.

Figure 6:
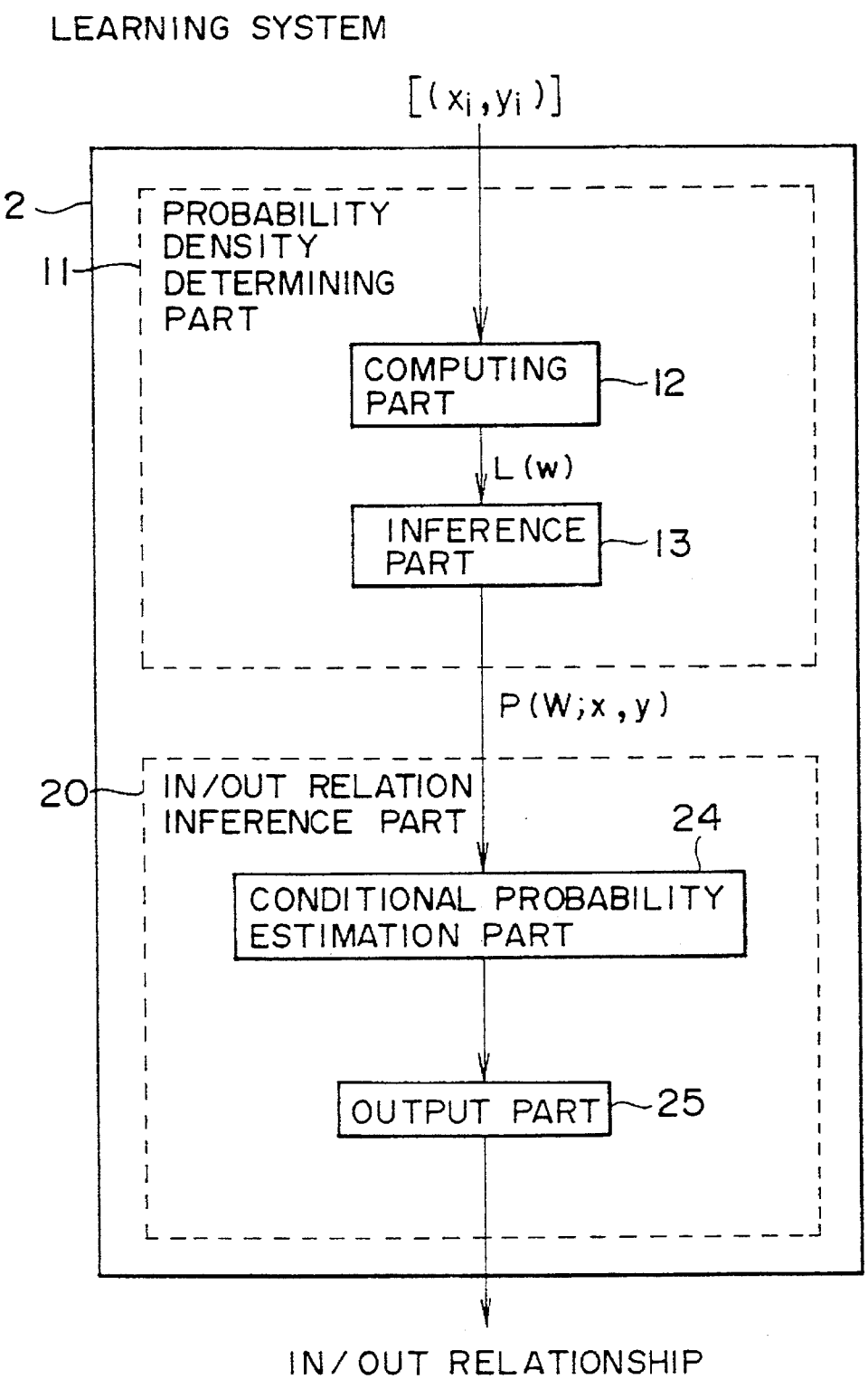
FIG. 6 is a block diagram showing a second embodiment of the learning system according to the present invention.

Next, a description will be given of a second embodiment of the learning system according to the present invention, with reference to FIGS. 6 and 7. FIG. 6 shows a neural network learning system 2 of this embodiment. The learning system 2, as shown in FIG. 6, includes the determining part 11 (having the computing part 12 and the inference part 13), which is essentially the same as shown in FIG. 2, and an input/output relationship inference part 20 for inferring and outputting the relationship between input vector x and output vector y in accordance with the probability density function P(w; x, y) obtained by the determining part 11.

The inference part 20 of the neural network learning system, shown in FIG. 6, includes a conditional probability estimation part 24 for computing a conditional probability distribution P(w; y|x) to determine outputs y for a given input x (or, a conditional probability distribution P(w; x|y) to determine inputs x for a given output y) in accordance with the probability density function P(w; x, y) supplied from the probability density determining part 11.

The inference part 20 shown in FIG. 6 further includes an output part 25 for outputting an input-output relationship between the input vector x and the output vector y in accordance with the conditional probability distribution from the conditional probability estimation part 24.

Next, the operation performed by the learning system 2 of the second embodiment shown in FIG. 6 (especially, the operation performed by the inference part 20) will be described. When the probability density function P(w; x, y) on the sum space as shown in FIG.7 is obtained by the determining part 11, the estimation part 24 determines a conditional probability distribution P(w; y|x) in accordance with the probability density function P(w; x, y) of the determining part 11, in order to obtain the relationship between the input vector x and the output vector y. This conditional probability distribution P(w; y|x) is given as follows.

$$P(w; y|x) = P(w; x, y)/P(w; x) \quad (4)$$

or $$P(w; x) = \int P(w; x, y') \, dy' \quad (5)$$

Figure 8:
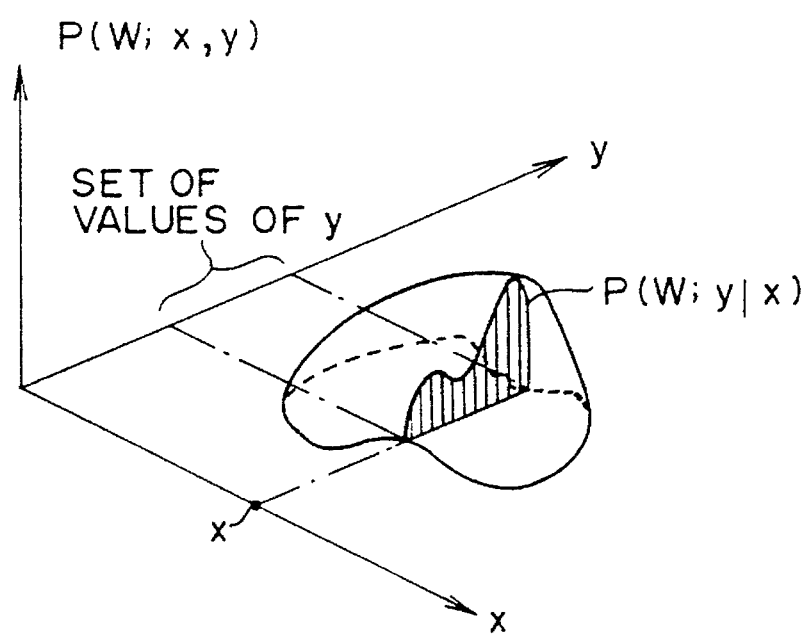
FIG. 8 is a diagram for explaining a conditional probability distribution to determine a set of output values of y from a given input value of x in accordance with the probability density function shown in FIG. 7.

When the conditional probability distribution P(w; y x) is obtained by the estimation part 24, the inference part 20 can determine a set of values of y from a given input sample x in accordance with the conditional probability distribution, as shown in FIG. 8. However, since the conditional probability distribution P(w; y|x) is not data that should be output, the output part 25 of the inference part 20 determines the relationship between input x and output y in accordance with the conditional probability distribution of the estimation part 24 by using one of the following methods.

The first of the above mentioned methods is that the output part 25 takes one of a set of random numbers, distributed with equal probability in an effective range of the space, and uses that random number as the output value of y having a probability according to the conditional probability distribution P(w; y x) of the estimation part 24. The output part 25 outputs the determined input-output relationship. In a case where a set of output values y corresponding to the value of input vector x exists, the output part 25 outputs a plurality of output values y having different probabilities.

A second method is that the output part 25 obtains the average of output values y from the conditional probability distribution P(w; y|x) of the estimation part 24, as follows.

$$\text{average of } y = \int y' \, P(w; y'|x) \, dy' \quad (6)$$

The output part 25 takes the average of output values y according to formula (6) as the input-output relationship that is to be output. When the second method described above is used, it is possible to determine the input-output relationship with good reliability when the variance of the output values is small.

A third method is that, when a limited number of output values y1, y2, . . . , ym corresponding to one given input x exist, the output part 25 outputs combinations of output value y and its probability density P(w; yi|x) as the output data of the input-output relationship. The combinations [(yi, P(w; yi|x)] (i=1,2, . . . , m) are output by the output part 25.

The third method described above can be suitably applicable to character recognition or voice recognition. By using the third method described above, it is possible to obtain the input-output relationship together with the reliability of each output.

In the above described operation performed by the inference part 20, it is possible to determine a set of values of y from the given input sample x in accordance with the conditional probability distribution of the estimation part 24. If the above mentioned procedure (one of the three methods) is applied to character recognition, one can obtain a set of character recognition results with the respective probabilities in response to a given input character pattern. For example, when an input character pattern "A" (the input vector x) is given, one can obtain the character recognition results including a first result "A" with 70% probability, a second result "A1" with 20% probability and a third result "A2" with 10% probability.

Figure 7:
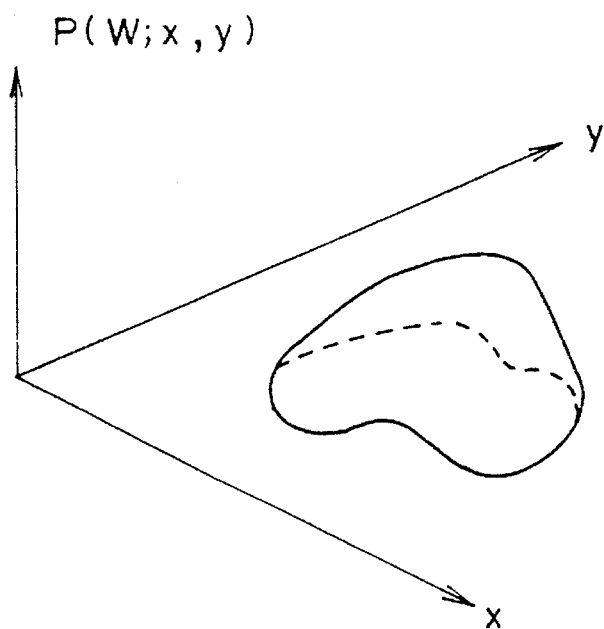
FIG. 7 is a diagram showing a probability density function obtained in the learning system shown in FIG. 6.

When the probability density function P(w; x, y) on the sum space shown in FIG. 7 is obtained, the inference part 20 can determine a probability P(x) of the input x in accordance with formula (5) only. When the thus determined probability P(x) of the input x has a relatively small value, it can be judged that the input x is data which has not been learned by the learning system. In other words, the learning system of the present invention can judge whether the input x is known or unknown.

In addition, if the probability density function P(w; x, y) shown in FIG. 7 is obtained, the inference part 20 obtains the conditional probability distribution as described above. By performing the reverse procedure, the inference part 20 can determine a set of values of input vector x from a given output sample y in accordance with the conditional probability distribution of the estimation part 24 having been determined. The conditional probability distribution in this case is obtained by the estimation part 24 as follows.

$$P(w; x|y) = P(w; x, y)/P(y) \quad (7)$$

or $$P(y) = \int P(w; x', y) \, dx' \quad (8)$$

Figure 9:
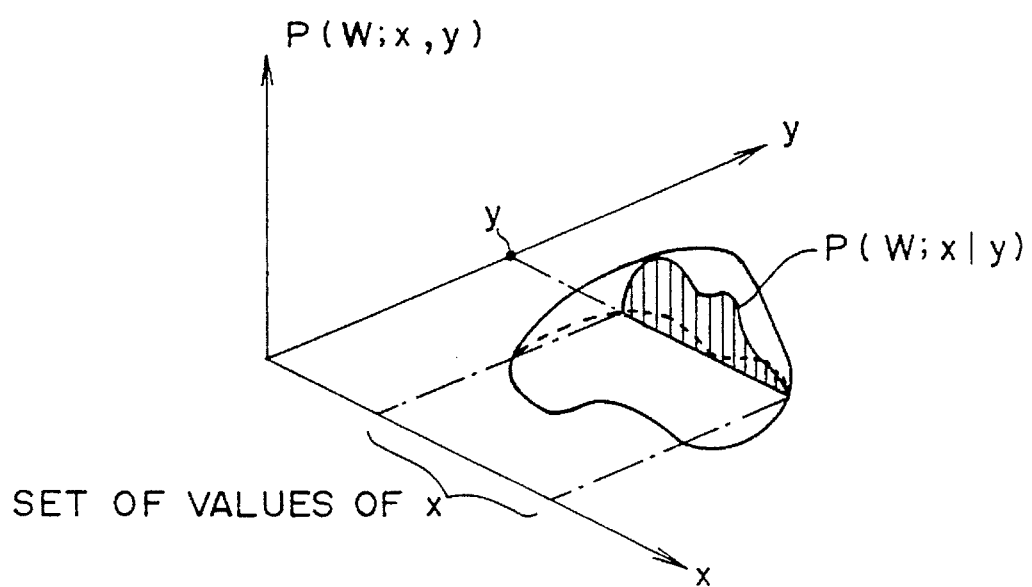
FIG. 9 is a diagram for explaining a conditional probability distribution to determine a set of input values of x from a given output value of y in accordance with the probability density function shown in FIG. 7.

In accordance with the conditional probability distribution P(w; x|y) of the estimation part 24, the inference part 20 can determine a set of values of input vector x from a given value of output vector y in accordance with the conditional probability distribution P(w; x|y), as shown in FIG. 9. The inference part 20 thus determines the relationship between the input vector x and the output vector y in accordance with the conditional probability distribution of the estimation part 24 by using one of the three methods described above.

When the probability density function P(w; x, y) on the sum space is obtained, the inference part 20 can infer and obtain a probability P(y) of the output y in accordance with formula (8) only. When the thus determined probability P(y) of the output y has a relatively small value, it can be judged that the output y is data which has not been learned by the learning system.

Next, a description will be given of some neural network models used by the learning system of the present invention when the form of the probability density function P(w; x, y) having the parameter w on the sum space A is predetermined. As a first neural network model as mentioned above, the following probability density function having the parameter w=(w1, w2) will be considered.

$$P(w; x, y) = \exp\{-R(w_1, x)\} \exp\{-\|y - \phi(w_2, x)\|^2\} \quad (9)$$

In response to the given value of the input vector x, the conditional probability distribution P(w; y|x) of formula (9) is determined as follows.

$$P(w; y|x) = C \exp\{-\|y - \phi(w_2, x)\|^2\} \quad (10)$$

The following formulas are derived by applying the above mentioned maximum likelihood method using formula (2) to the above formula (10).

$$dw_1 = -\sum_i (\partial R(w_1, x_i)/\partial w_1)$$

$$dw_2 = -\sum_i \partial\{y_i - \phi(w_2, x_i)^2\}/\partial w_2 \quad (11)$$

It should be noted that the above formulas (11) are in accordance with the known error back-propagation results according to the learning method used in the conventional neural network. Thus, the first example of the neural network model used in the learning system of the present invention is an extension of a conventional neural network model. By using the first example of the neural network model mentioned above, it is possible to provide a generalized multi-layered perceptron (MLP) neural network used in the learning system according to the present invention.

The following example is an assumed probability density function P(w; x, y) for use in a function approximation neural network (FANN). Consideration will be given to this example.

$$P(w; x, y) = [1/(2\pi\sigma^2)^{N/2}] \cdot R(x) \cdot \exp\{-\|y - \phi(w_2, x)\|^2/(2\sigma^2)\} \quad (12)$$

$$\int R(x)dx = 1$$

In this example, it is impossible to obtain the conditional probability distribution of the input vector x in accordance with the probability density function of formula (12) since the function R(x) of this formula indicating the input probability distribution has no parameter w.

In contrast, when the probability density function P(w; x, y) of formula (9) is used by the learning system of the present invention, one can obtain the conditional probability distribution of the input vector x in accordance with formula (9) since the function R(w1, x) of formula (9) has the parameter w1. The learning and the inference can be suitably carried out with respect to the parameters w1 and w2 in the case of the above mentioned first example of the neural network model wherein the probability density function P(w; x, y) of formula (9) is used. After the learning of the samples is performed, the probability density R(w1, x) of the input vector x is obtained. Thus, it can be determined whether the value of the input vector x is known or unknown, by comparing the value of the function R(w1, x) with a prescribed value.

As a second neural network model as mentioned above, the following probability density function will be considered, which function has the parameter wh=(xh, yh, θh).

$$P(w; x, y) = \sum_{h=1}^{H} \exp\{-x - x_h^2 - y - y_h^2 - \theta_h\} \quad (13)$$

The form of the probability density function P(w; x, y) is in accordance with formula (3), and the probability density function of formula (13) indicates the linear combination of probabilities of the normal distributions with respect to the input vector x and the output vector y, as shown in FIG. 5. When the probability density function of formula (13) is assumed, the conditional probability distribution P(w; y|x) of formula (13) in response to the given input vector x is as follows.

$$P(w; y|x) = \frac{\Sigma \exp\{-x - x_h^2 - y - y_h^2 - \theta_h\}}{\Sigma \sqrt{2\pi} \times \exp\{-x - x_h^2 - \theta_h\}} \quad (14)$$

The following formulas are derived by applying the above mentioned maximum likelihood method using formula (2) to the above formula (14).

$$d\theta_h = -\sum_h \frac{\exp\{-x - x_h^2 - y - y_h^2 - \theta_h\}}{P(w; x, y)} \quad (15)$$

$$dx_h = -\sum_h \frac{(x_h - x)\exp\{-x - x_h^2 - y - y_h^2 - \theta_h\}}{P(w; x, y)}$$

-continued $$dy_h = -\sum_h \frac{(y_h - y)\exp\{-x - x_h^2 - y - y_h^2 - \theta_h\}}{P(w; x, y)}$$

Figure 10:
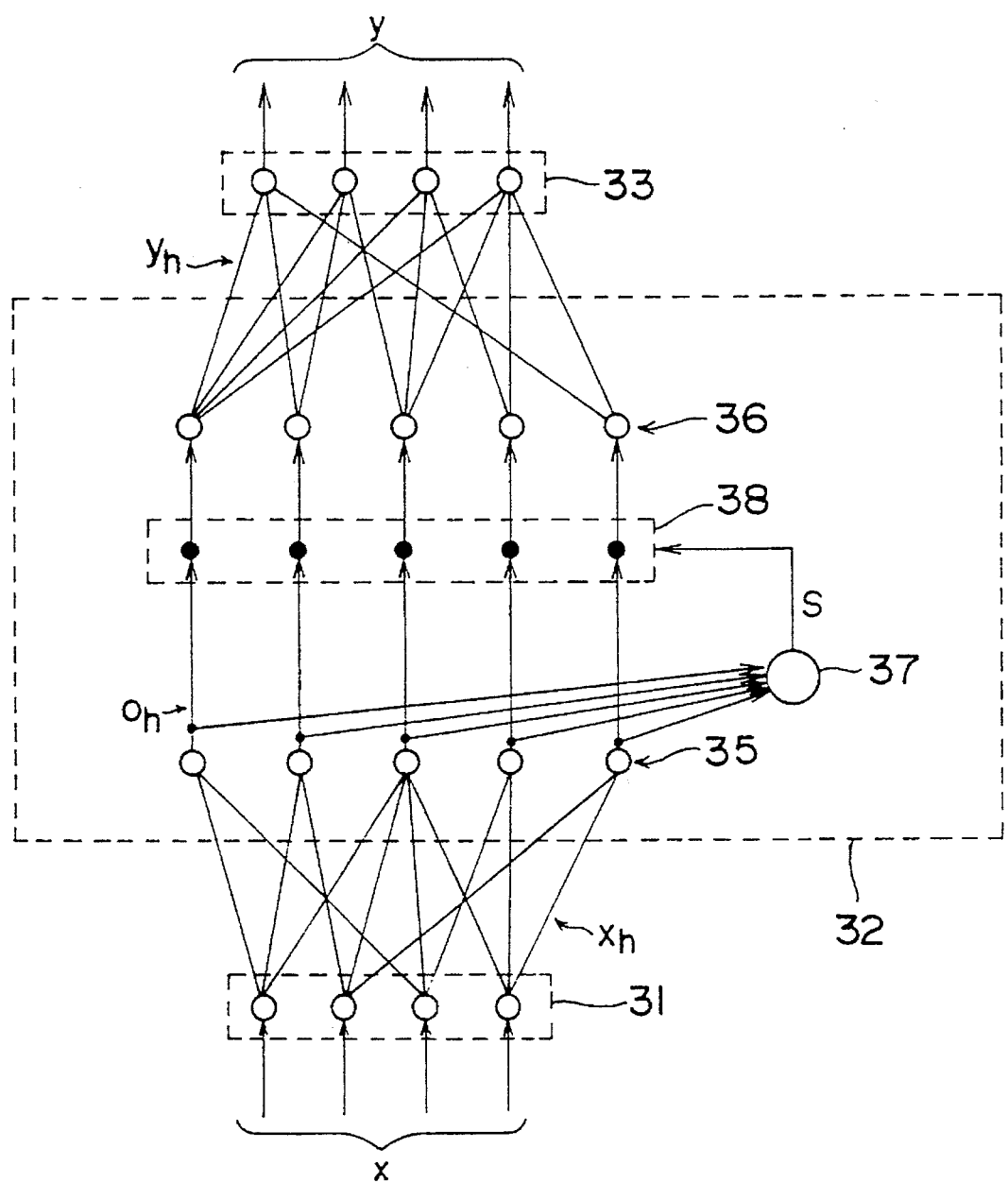
FIGS. 10 through 12 are diagrams showing examples of neural networks in the learning system according to the present invention.

FIG. 10 shows an example of the neural network in which the second neural network model described above is embodied for use in the learning system according to the present invention. This neural network, as shown in FIG. 10, includes an input layer 31, an intermediate layer 32, and an output layer 33. In the intermediate layer 32, there are a stimulating cell unit layer 35 having a set of units corresponding to a set of input units of the input layer 31, a stimulating cell unit layer 36 having a set of units corresponding to a set of output units of the output layer 33, a number of normalizing parts 38, and a restraining cell unit 37.

The number of the units in the stimulating cell unit layer 35 is indicated by "H" and the number of the units in the stimulating cell unit layer 36 is indicated by "H". One of the units of the stimulating cell unit layer 35 corresponds to one of the units of the stimulating cell unit layer 36. The normalizing parts 38 and the restraining cell unit 37 are provided between the stimulating cell unit layer 35 and the stimulating cell unit layer 36.

When the input x is given to the input layer 31, each of the units of the input layer 31 outputs the value of xh (h=1, 2, . . . , H) to the corresponding unit of the stimulating cell unit layer 35 of the intermediate layer 32.

In the intermediate layer 32 shown in FIG. 10, each unit of the stimulating cell unit layer 35 produces an output value oh (h=1, 2, . . . , H) to the restraining part 37 so that the sum S of the output values oh from the stimulating cell unit layer 35 is computed by the restraining part 37 and the sum S of the output values oh is output to the normalizing parts 38.

The normalizing parts 38 respectively normalize the output values oh of the layer 35 by dividing each output value oh by the sum S of the restraining part 37, and the normalized output values oh/S are respectively output by the normalizing parts 37 to the corresponding units of the stimulating cell unit layer 36. Each unit of the stimulating cell unit layer 36 produces an output value yh (h=1, 2, . . ., H) to the corresponding unit of the output layer 33, so that output values y are respectively output by the units of the output layer 33.

More specifically, when the input values x are given to the input layer 31, the output value oh produced by each unit of the stimulating cell unit layer 35 to the restraining part 37 is determined as follows.

$$O_h = \exp\{-\|x - x_h\|^2 - \theta_h\} \quad (16)$$

The sum S of the output values oh output by the restraining part 37 to the normalizing parts 38 is determined as follows.

$$S = \sum_{h=1}^{H} O_h \quad (17)$$

As the result of the above described procedure, the conditional probability distribution of the output vector y produced by the output layer 33 is determined as follows.

$$P(w; y|x) = \sum_{h=1}^{H} (O_h/S) \times \exp(-y - y_h^2) \quad (18)$$

The form of the above formula (18) corresponds to the form of formula (14), and it can be readily understood that the second neural network model described above is embodied in the neural network shown in FIG. 10. Thus, by applying the above formula (18), it is possible to construct a neural network learning system in which the neural network shown in FIG. 10 is used. The learning can be carried out by the learning system in accordance with the learning rule of the above formula (15).

Next, as a third neural network model, the following probability density function will be considered, which function has the parameter wh=(xh, yh, θh).

$$P(w; x, y) = \sum_{h=1}^{H} \exp\{-x - x_h^2 - y - \phi(w_h, x)^2 - \theta_h\} \quad (19)$$

The form of the probability density function P(w; x, y) of the formula (19) is in accordance with that of the formula (3). When the probability density function of the formula (13) is assumed, the conditional probability distribution P(w; y|x) of formula (13) in response to a given value of the input vector x is determined as follows.

$$P(w; y|x) = \frac{\Sigma \exp\{-x - x_h^2 - y - \phi(w_h, x)^2 - \theta_h\}}{\Sigma \sqrt{2\pi} \times \exp\{-x - x_h^2 - \theta_h\}} \quad (20)$$

Thus, by applying the maximum likelihood method using formula (2) to the above formula (20), it is possible to obtain a learning rule which is similar to that obtained according to formulas (15).

Figure 11:
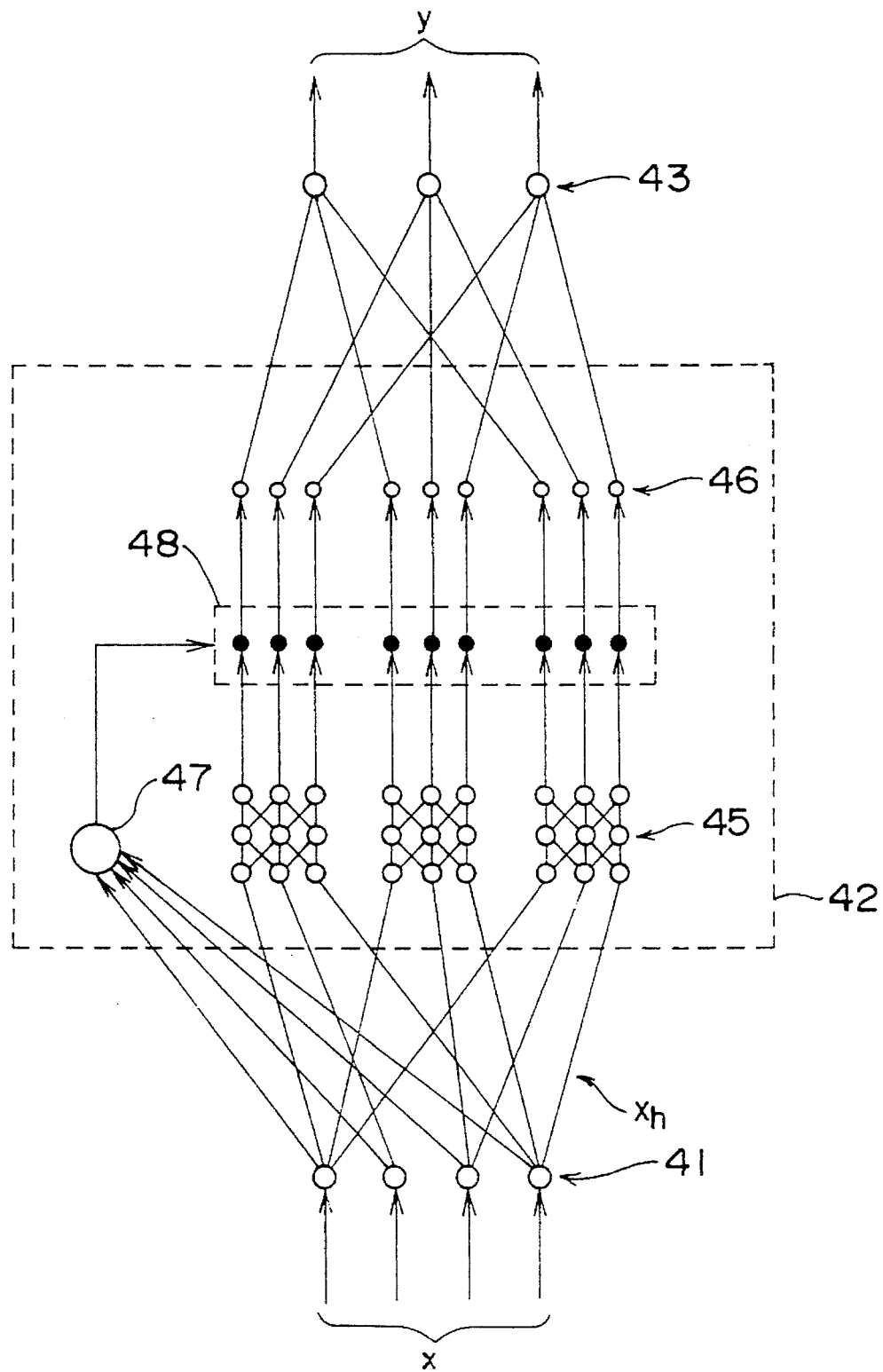

FIG. 11 shows another example of the neural network in which the third neural network model described above is embodied for use in the learning system according to the present invention. This neural network, as shown in FIG. 11, includes an input layer 41, an intermediate layer 42, and an output layer 43. In the intermediate layer 42, there are a first cell unit layer 45 having units corresponding to input units of the input layer 41, a second cell unit layer 46 having units corresponding to output units of the output layer 43, a number of normalizing parts 48, and a restraining cell unit 47.

The function φ (wh, x) of formula (20) is defined with the first cell unit layer 45. The normalizing parts 48 and the restraining cell unit 47 are provided between the first cell unit layer 45 and the second cell unit layer 46.

The units of each of the first cell unit layer 45 and the second cell unit layer 46 are divided into groups of units, each group corresponding to one of the units of the output layer 43. Also, the normalizing parts 48 are divided into groups of units, each group corresponding to one of the units of the output layer 43. One of the units in each group of the second cell unit layer 46 produces an output value to one of the units of the output layer 43.

When the input x is given to the input layer 41, each of the input units of the input layer 41 outputs an output value xh (h=1, 2, . . . , H) to the corresponding unit of the first cell unit layer 45 in the intermediate layer 42. Each of the input units of the input layer 41 also produces the output value xh to the restraining cell unit 47, so that the sum of the output values xh from the input layer 41 is computed by the restraining cell unit 47 and that the sum of the output values xh is output to the normalizing parts 48.

The normalizing parts 48 respectively normalize output values from the units of the first cell unit layer 45 by dividing each output value by the sum from the restraining cell unit 47. The normalized output values from the normalizing parts 48 are provided to the corresponding units of the second cell unit layer 46. One of the units in each group of the second cell unit layer 46 produces an output value to the corresponding unit of the output layer 43.

In the neural network described above, it is possible to obtain the conditional probability distribution P(w; y|x) of the output vector y in accordance with formula (20). Thus, it is possible to obtain a probability unified perceptron by utilizing the above described neural network, and the learning can be performed in accordance with a prescribed learning rule according to formula (20).

As described above in the first and second embodiments of the learning systems shown in FIGS. 2 and 6, when the neural networks shown in FIGS. 10 and 11 are used, it is possible to obtain the conditional probability distribution by using one of the three methods described above. Thus, a set of values of input vector x from a given value of output vector y can be determined, and a set of values of output vector y from a given value of input vector x can be determined in the reverse procedure. Also, when the neural networks shown in FIGS. 10 and 11 are used, it is possible to judge whether the given input x is known or unknown.

In the first model shown in FIG. 10, it is possible to infer and obtain the probability distribution of input vector x when the probability density function P(w; x, y) of formula (9) is assumed. After the learning is performed based on the resulting probability distribution, it can be judged whether the input vector x is known or unknown.

However, in the foregoing description, no specific example of the function R(w1, x) of formula (9) is given, which function indicates the probability distribution of the input vector x. Therefore, a description will be given of an example of the function R(w1, x) and how to judge whether the input vector x is known or unknown.

The probability density function P(w; x, y) of formula (9) is re-written as follows.

$$P(w_1, w_2; x, y) = \frac{R'(w_1; x)}{(2\pi\sigma^2)^{N/2}} \times \exp\left\{-\frac{y - \phi(w_2; x)^2}{2\sigma^2}\right\} \quad (21)$$

In this formula, $\phi$ ($w_2$; x) is a function derived from the multi-layered perceptron (MLP). The function R'(w1; x) of formula (21) corresponds to the function R(w1, x) of formula (9). An example of the function R'(w1; x) of formula (21) is as follows.

$$R'(w_1; x) = \frac{1}{Z(\theta)} \sum_{h=1}^{H} \frac{1}{(2\pi\sigma_h)^2} \times \exp\left\{-\frac{x - x_h^2}{2\sigma_h^2} + \theta_h\right\} \quad (22)$$

$$Z(\theta) = \Sigma \exp(\theta_h)$$

In the above mentioned example, the function R'(w1; x) indicating the probability distribution of input vector x is approximated by the linear combination of probabilities of a prescribed probability density function (e.g., normal distribution function having parameters xh, σh and θh). When the function R'(w1; x) is approximated by the linear combination of such probabilities, the learning of the multi-layered perceptron function f(w2; x) is achieved by performing the learning of the parameter w2 of formula (21). The inference of the probability distribution of input vector x is achieved by performing the learning of the parameter w1 of formula (21), the parameter w1 being a function of xh, σh, θh (h=1, 2, . . . , H).

The above mentioned maximum likelihood method, used in the second neural network model, is used as the learning rules for the learning of the parameters w1 and w2. When the maximum likelihood method mentioned above is used, the learning rules for the learning of the parameters w1 and w2 are as follows.

$$\frac{dw_1}{dt} = \sum_{i=1}^{S} \frac{\partial}{\partial w_1} \log P(w_1, w_2; x, y) \quad (23)$$

$$\frac{dw_2}{dt} = \sum_{i=1}^{S} \frac{\partial}{\partial w_2} \log P(w_1, w_2; x, y) \quad (24)$$

The following formula is derived from the learning rule of the above formula (24).

$$\frac{dw_2}{dt} = \sum_{i=1}^{S} \frac{\partial}{\partial w_2} y_i - \phi(w_2; x_i)^2 \quad (25)$$

It should be noted that the form of formula (25) is in accordance with that of the known error back-propagation method.

The following formulas are derived by substituting the function R'(w1; x) of formula (22) into formula (23).

$$\frac{dx_h}{dt} = \sum_{i=1}^{S} \frac{(x_i - x_h)S_h}{\sigma_h^2} \quad (26)$$

$$\frac{d\sigma_h}{dt} = \sum_{i=1}^{S} \frac{2N_{hi} - N}{\sigma_h^2}$$

$$\frac{d\theta_h}{dt} = \sum_{i=1}^{S} \left\{ S_{hf} - \frac{\exp(\theta_h)}{Z(\theta)} \right\}$$

In the above formulas (26), Shi and Nhi respectively denote the following formulas.

$$S_{hi} = \frac{\exp\{-x_i - x_h^2/(2\sigma_h^2) + \theta_h\}}{R(w_1; x)Z(\theta)(2\pi\sigma_h^2)^{N/2}} \quad (27)$$

$$N_{hi} = \|x_i - x_h\|^2/(2\sigma_h^2)$$

All the values of the above mentioned formulas can be determined from the values of the input and output vectors x and y, and it is possible to easily and quickly perform the learning of the parameter w1. In the above described example, by using the approximation of the function R'(w1; x) by the linear combination of probabilities of the prescribed probability density function, it is possible to easily and quickly perform the learning of the parameter w1. Thus, a specific probability distribution of input vector x can be inferred and obtained. By using the probability distribution after the learning is performed, it is possible to output the probability of occurrence of the input vector x.

Figure 12:
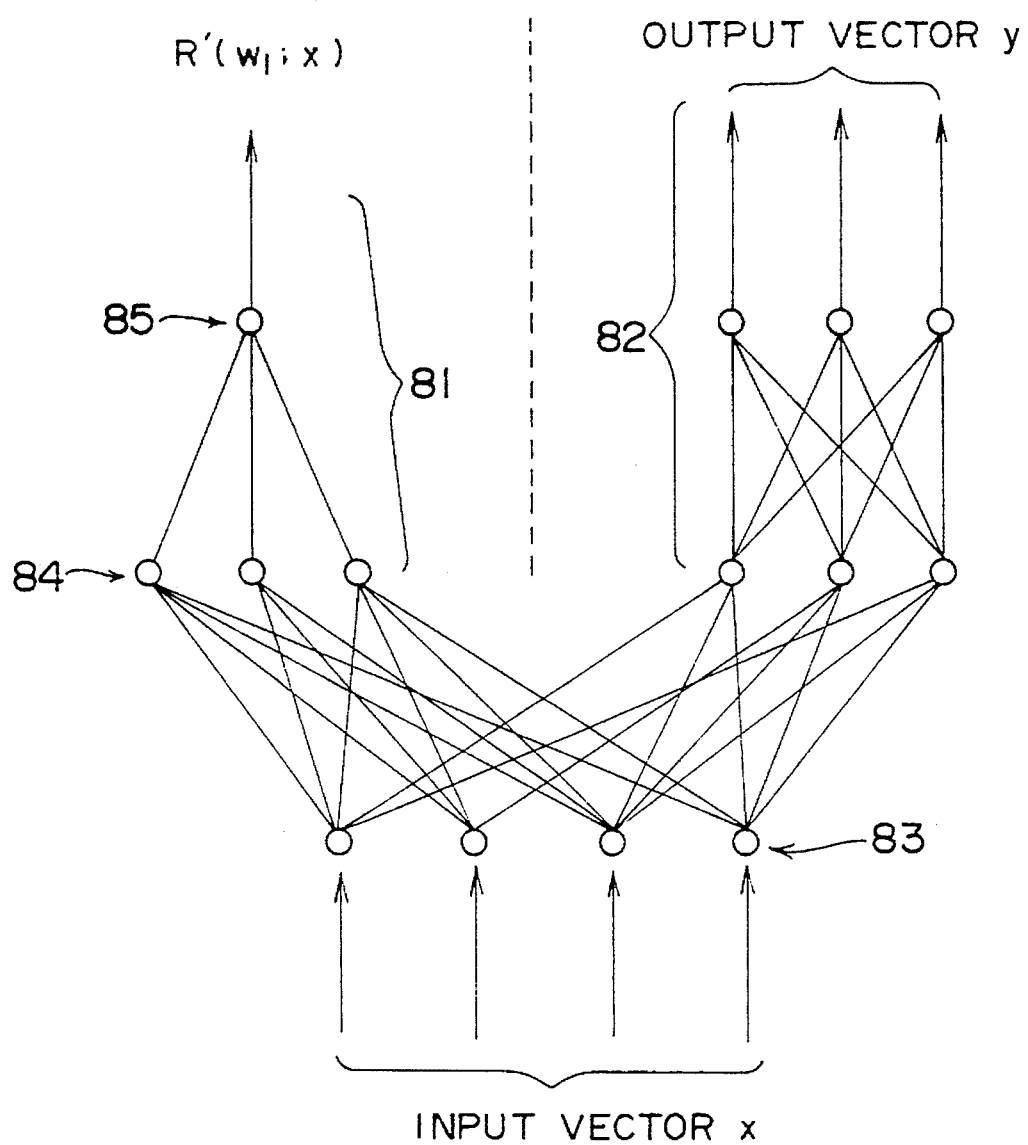

FIG. 12 shows an example of the neural network in which the probability density function P(w1, w2; x, y) of formula (21) is used. This neural network, as shown in FIG. 12, includes a first neural network 81 and a second neural network 82. The first neural network 81 judges whether the given input vector is known or unknown. The second neural 82 has the capability corresponding to the multi-layered perceptron (MLP) or the radial basis functions (RBF). The first neural network 81 includes an input layer 83, an intermediate layer 84, and an output layer 85.

The second neural network 82 includes the input layer 83 which is shared by the first neural network 81. The second neural network 82 also includes an intermediate layer and an output layer. The intermediate layer and output layer in the second neural network 82 are the same as those of the known MLP neural network, a description thereof being omitted.

In the neural network with the above mentioned construction, the learning of the parameter w2 of the function P(w1, w2; x, y) is performed by the second neural network 82, and the learning of the parameter w1 is performed by the first neural network 81 as described above.

After the learning of each of the parameters w1 and w2 is performed, the second neural network 82 produces output y, corresponding to the output in the MLP neural network, and the first neural network 81 outputs the function R'(w1; x) indicating the probability distribution of input x.

More specifically, in the first neural network, when the input vector x is given to the input layer 83, the values of the function according to formulas (26) and (27) are determined by the the input layer 83 and the intermediate layer 84, so that the function R'(w1; x) indicating the probability distribution of the input vector x is output by the output layer 85. If the value of the function R'(w; x) is greater than a prescribed value, it is judged that the input vector x is known. Conversely, if the value of the function R'(w1; x) is smaller than the prescribed value, it is judged that the input vector x is unknown. In this manner, it is possible to judge whether the input value x is known or unknown.

In an extended neural network learning system of the first and second embodiments of the present invention, not only the inference of output y (=ϕ(w; x)) but also the inference of the variance of outputs can be performed. Thus, in such a learning system of the present invention, an accurate output probability can be obtained. For example, it is possible that the learning system provides information that at the critical factor of 99% the output y lies in the range which follows.

$$\phi(w; x) - \sigma(w, x) < y < \phi(w; x) + \sigma(w, x)$$

Next, a description will be given of a neural network learning system in which the accuracy of the output probability is ensured. Herein, a neural network model which uses a probability density function P(w; x, y) indicating the input-output relationship and a parameter w=(w1, w2) is considered. The probability density function P(w; x, y) is given as follows.

$$P(w; x, y) = (1/Z(w_1)) \exp[-\{(y-\phi(w_2, x))/\sigma(w_1, x)\}^2] \quad (28)$$

In this formula, ϕ(w2; x) denotes the function indicating the average of the probability distribution being inferred, and σ(w1, x) denotes the function indicating the standard deviation thereof. These functions are obtained in the above mentioned model through the learning of the neural network.

In the above formula (28), Z(w1) denotes a normalizing factor which makes the integral of the probability density function P(w; x, y) equal to 1. This normalizing factor is obtained by simple computation as follows.

$$\begin{aligned} Z(w_1) &= \iint P(w; x, y) dx dy \\ &= \pi^{N/2} \int \sigma(w_1, x) dx \end{aligned} \quad (29)$$

If it is proved that the given teaching data is in conformity with the probability distribution according to formula (28) at good accuracy, it is possible to correctly perform the inference of the output of the neural network with the accuracy of the output being ensured. For example, one can obtain the information indicating that at the critical factor of 99% the output y lies in this range:

$$\phi(w_2, x) - 3\sigma(w_1, x) < Y < \phi(w_2, x) + 3\sigma(w_1, x) \quad (30)$$

Accordingly, by using the above described method, one can predict what variance relative to the average ϕ(w2; x) the output Y has. Thus, it is possible to correctly estimate the reliability of the output probability.

Next, a method to infer the average function ϕ(w2; x) and the standard deviation function o(w1; x) used by the above described learning system will be described. Similarly to the first and second embodiments described above, the probability or likelihood function L(w) is determined from a set of given input and output samples [(xi, yi)] in accordance with formula (1). By applying the maximum likelihood method to the logarithm function log L(w), as described above, the parameter differential "dw" according to formula (2) is repeatedly computed. Thus, the learning rule with respect to the parameter w2 is obtained by substituting the above formulas (1) and (28) into formula (1), as follows.

$$dw_2 = -(1/\sigma(w_1, x_i)^2)[(\delta/\delta w_2)(y_i - \phi(w_2, x_i))^2] \quad (31)$$

From the above formula (31), it is readily understood that, except the learning of the parameter w2 becomes slower when the variance of the outputs increases, the learning method is the same as the known back-propagation learning method. In the case of the MLP neural network, if the following formula is used as the function ϕ(w2; x), the learning system of the present invention can perform the neural network learning process being currently in wide use.

$$\phi(w_2, x) = \rho(\Sigma w_{ij} \rho(\Sigma w_{jk} x_k)) \quad \rho(x) = 1/(1+\exp(-x)) \quad (32)$$

In the case of the RBF neural network, if the following formula is used as the function ϕ(w2; x), the learning system of the present invention can perform the learning of the RBF neural network.

$$\phi(w_2, x) = \Sigma C_i \exp(-(x-d_i)^2) \quad (33)$$

The method to infer the standard deviation o(w1, x) will be described. The following formula, which indicates the learning rule with respect to the parameter w1, is derived from formula (28).

$$\begin{aligned} dw_1 &= (\partial/\partial w_1)[-\{(y_i - \phi(w_2, x_i))/ \\ &\quad \sigma(w_1, x_i)\}^2 - Z(w_1)] \\ &= 2(y_i - \phi(w_2, x_i))^2[\partial\sigma(w_1, x)/\partial w_1/ \\ &\quad \sigma(w_1, x_i)^3] - (\partial/\partial w_1)Z(w_1) \end{aligned} \quad (34)$$

Figure 13:
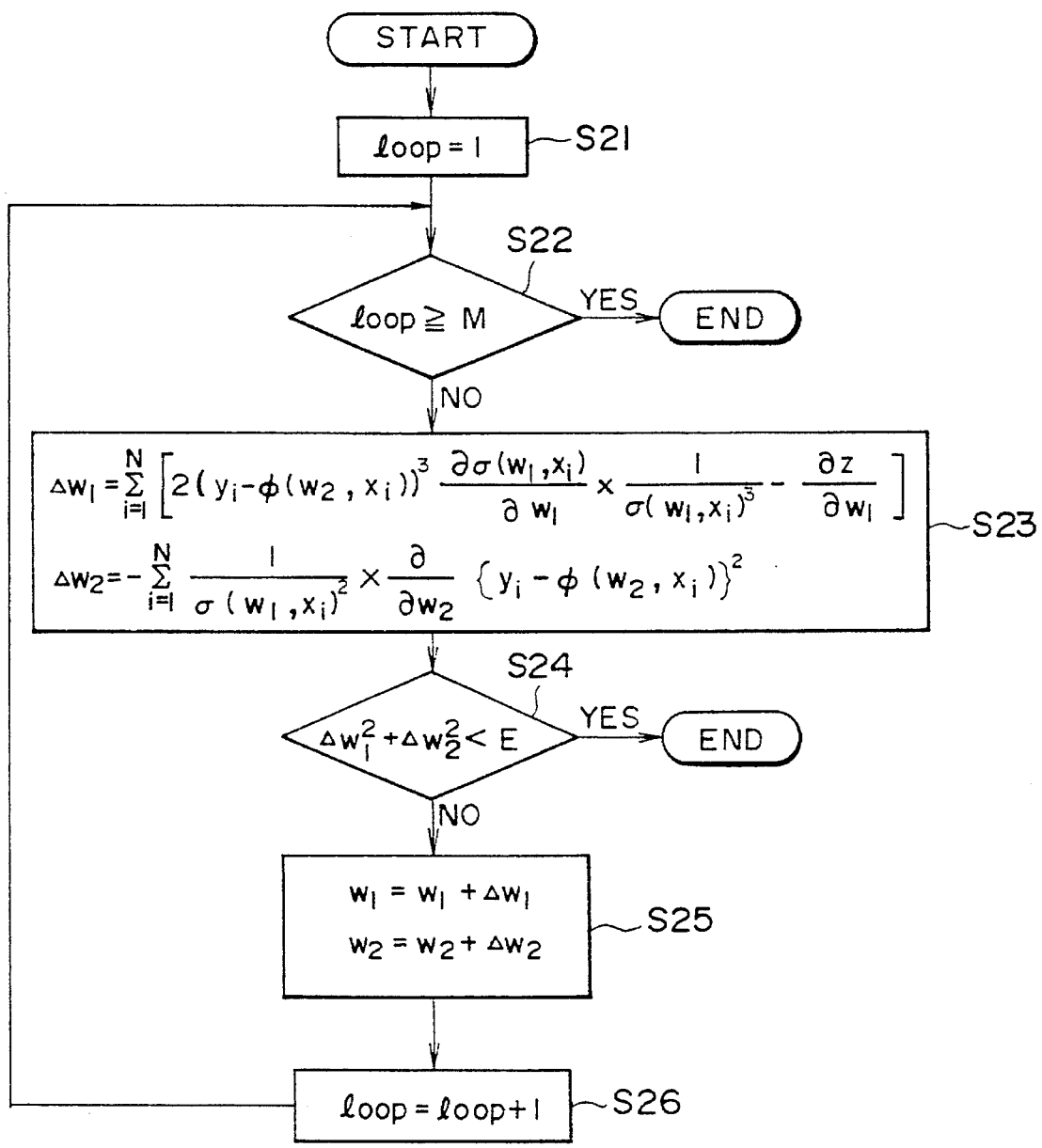
FIG. 13 is a flow chart for explaining a learning process performed according to the present invention.

FIG. 13 shows a learning process which is performed according to the learning rules of formulas (31) and (34) described above. In this learning process, the maximum number "M" of iterations of the learning routine for a set of input and output samples [(xi, yi)] is predetermined. The sum of squares of parameter differentials "dw1" and "dw2" is compared with the predetermined reference value "E" so as to judge whether or not the learning of the parameters w1 and w2 is completed.

In the flow chart shown in FIG. 13, when the set of input and output samples [(xi, yi)] is given, step S21 initially sets a count number "loop" to 1. Step S22 detects whether or not the count number "loop" has reached the maximum number M by comparing the count number "loop" with the maximum number M. If the count number "loop" has reached the maximum number M, the learning process ends. The subsequent steps S23 through S26 are repeated to perform the learning until the count number "loop" has reached the maximum number M.

Step S23 computes the value of the parameter differential "dw1" and the value of the parameter differential "dw2" from the samples [(xi, yi)] according to the learning rules of formula (34) and (31). Step S24 computes the sum of squares of the parameter differentials "dw1" and "dw2", and detects whether or not the sum of the squares is smaller than the reference value "E".

When the sum of the squares is not smaller than the reference value "E", the next step S25 is taken. Step S25 increments the parameter w1 by the value of the parameter differential "dw1", and increments the parameter w2 by the value of the parameter differential "dw2". Step S26 increments the count number "loop" by one. Then, the steps S22 to S26 are repeated to perform the learning of the parameters.

When step S24 detects that the sum of the squares is smaller than the reference value "E", it is determined that the learning of the parameters is completed, and the learning process ends. The neural network learning system outputs the probability density $P(w; x, y)$ on the sum space A. Especially, by using the value of the parameter w1 at this time, the inference of the standard deviation is performed in the learning system.

A special case of the standard deviation function is derived from the linear combination of values of a Gaussian type exponential function. The standard deviation function of this case is indicated as follows.

$$\sigma(w_1, x) = \Sigma C_i \exp(-(x-d_i)^2) \ w_1 = \{(C_i, d_i); i=1, 2, \ldots\} \quad (35)$$

In the above mentioned case, the standard deviation is obtained by the RBF neural network. A normalizing factor $Z(w1)$ according to formula (28) is determined as follows.

$$\begin{aligned} Z(w_1) &= \pi^{N/2} \int \sigma(w_1, x) dx \\ &= \pi^{(M+N)/2} \Sigma C_i \end{aligned} \quad (36)$$

According to the above formula (34), the learning rules with respect to the parameters Ci and di are derived, as follows.

$$\begin{aligned} dC_i &= (\partial/\partial x_i)\left[-\{(y_i - \phi(w_2, x_i))/\sigma(w_1, x_i)\}^2 - Z(w_i)\right] \\ &= 2(y_i - \phi(w_2, x_i))^2 \left[(\partial\sigma(w_1, x_i)/\partial C_i)/\sigma(w_1, x_i)^3\right] - \pi^{(M+N)/2}] \\ \text{where } \partial\sigma(w_1, x_i)/\partial C_i &= \exp(-(x_i - d_i)^2) \end{aligned} \quad (37)$$

$$\begin{aligned} dd_i &= (\partial/\partial d_i)\left[-\{(y_i - \phi(w_2, x_i))/\sigma(w_1, x_i)\}^2 - Z(w_i)\right] \\ &= 2(y_i - \phi(w_2, x_i))^2 \left[(\partial\sigma(w_1, x)/\partial d_i)/\sigma(w_1, x_i)^3\right] \\ \text{where } \partial\sigma(w_1, x_i)/\partial d_i &= 2C_i(x - d_i)\exp(-(x_i - d_i)^2) \end{aligned} \quad (38)$$

From these formulas, it is understood that a concrete learning rule to obtain the standard deviation is applicable to the learning system of the present invention. All the values of the parameter differentials dCi and ddi of formulas (37) and (38) are easily computed from the outputs of the intermediate or the output layer in the neural network. This function can be easily used as a supplementary capability for the neural network in which the learning is performed through the known back-propagation method.

Figure 14:
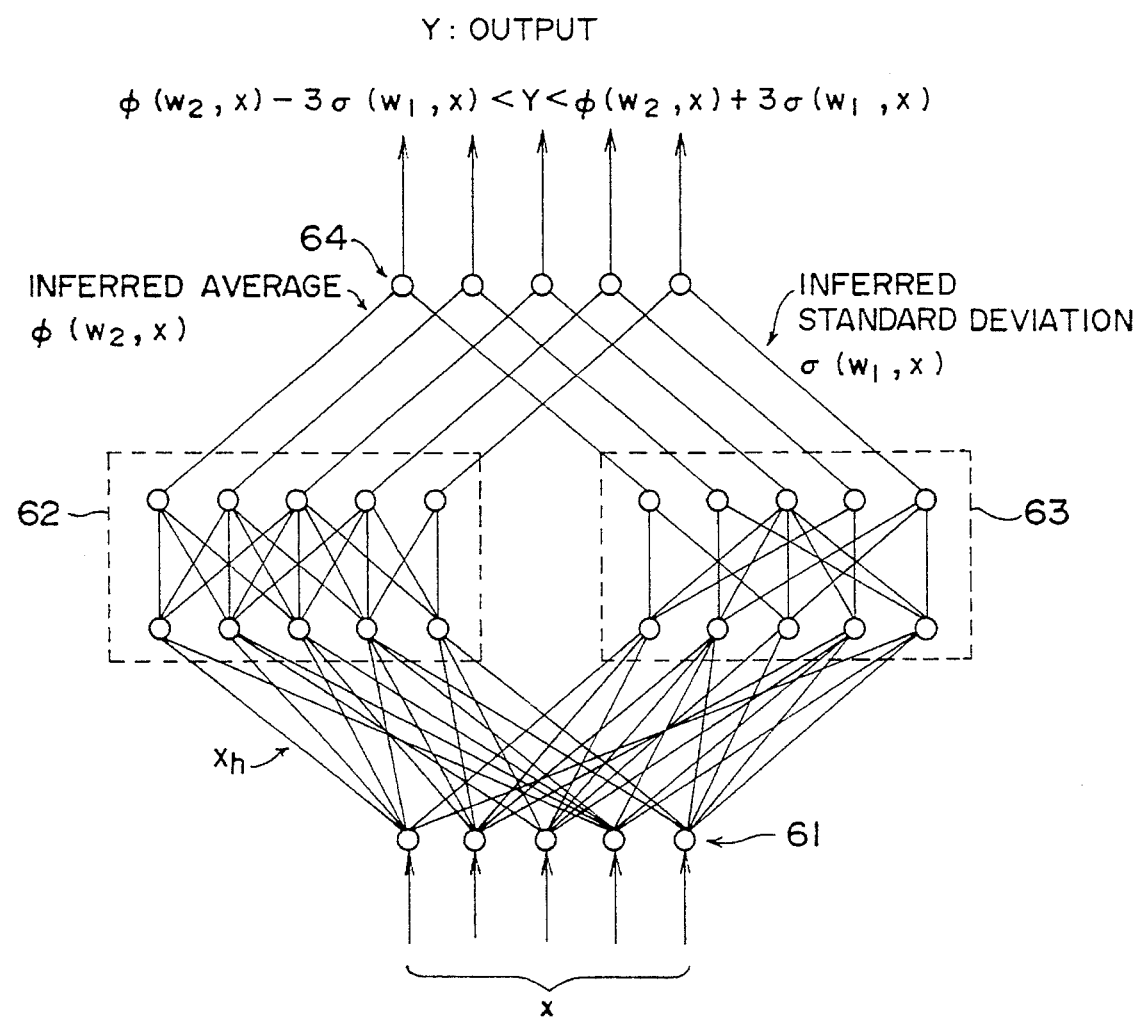
FIG. 14 is a diagram showing another example of a neural network in the learning system according to the present invention.

FIG. 14 shows a neural network in which the conditions to ensure the accuracy of the probability of the output are incorporated. In the neural network shown in FIG. 14, there are an input layer 61, a first intermediate layer 62, a second intermediate layer 63 provided in parallel with the first intermediate layer 62, and an output layer 64.

When the input vector x is given, the input layer 61 produces an output value xh for the input vector x. As shown in FIG. 14, the output value xh is supplied to both the first intermediate layer 62 and the second intermediate layer 63. In response to the output value xh of the input layer 61, the first intermediate layer 62 produces an inferred average $\phi(w2; x)$, and it is supplied to the output layer 64. In response to the output value xh of the input layer 61, the second intermediate layer 63 produces an inferred standard deviation $\sigma(w1; x)$, and it is supplied to the output layer 64.

The output layer 64 produces the output Y from the average of the layer 62 and the standard deviation of the layer 63, such that the value of the output Y from the output layer 64 at the critical factor satisfies these conditions:

$$\phi(w2; x) - 3\sigma(w1, x) < Y < \phi(w2; x) + 3\sigma(w1, x)$$

Therefore, in the neural network shown in FIG. 14, it is possible that the accurate probability of the output Y is produced.

Figure 15:
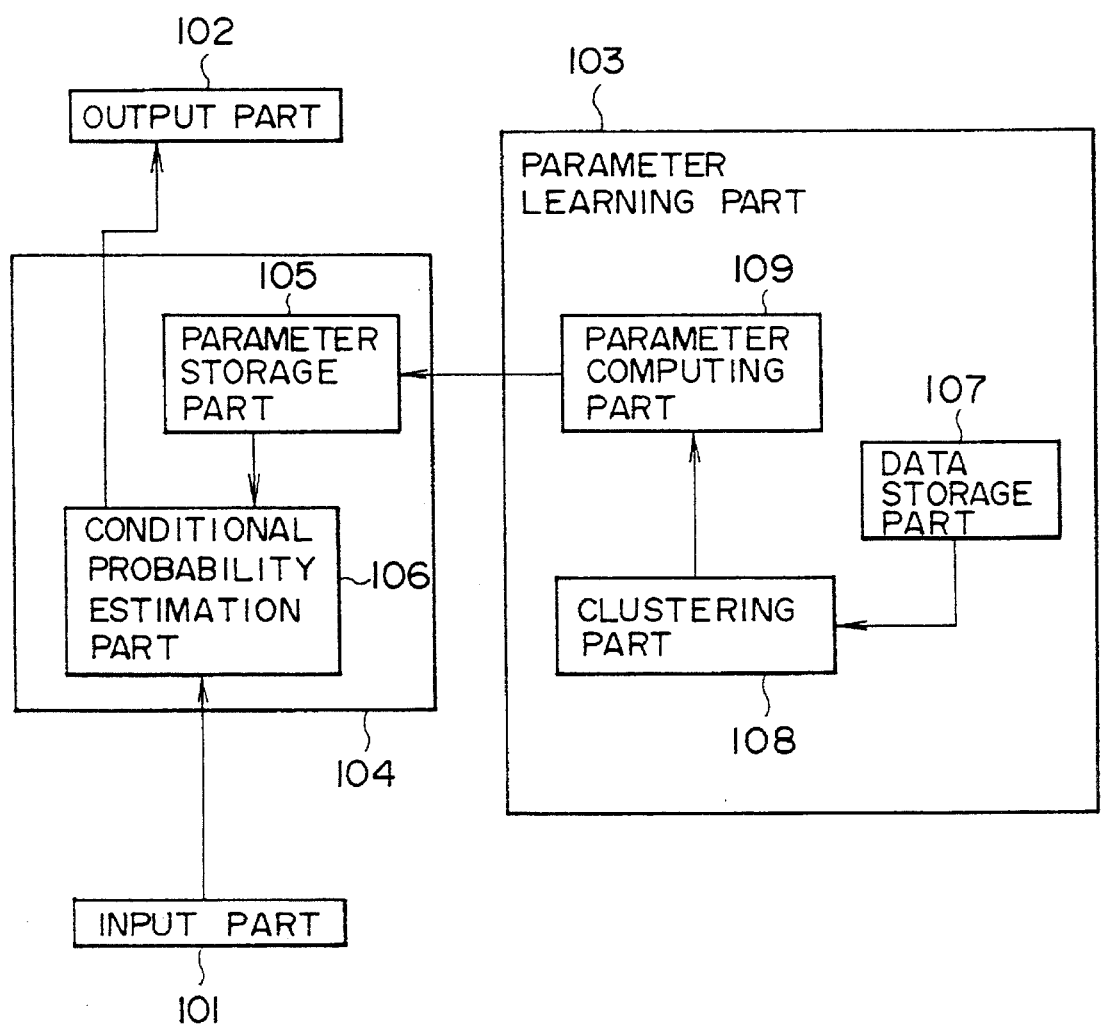
FIG. 15 is a block diagram showing a third embodiment of the learning system according to the present invention.

FIG. 15 shows a third embodiment of the neural network learning system according to the present invention. In the learning system shown in FIG. 15, there are an input part 101 for inputting input vector x having N data elements from an external unit (not shown), an output part 102 for producing output vector y having M data elements, an output probability determining part 103, and a parameter learning part 103. For example, when the learning system described above is applied to character recognition, a character feature vector extracted by the external unit from character data is supplied to the input part 101.

The part 104 shown in FIG. 15 determines an output probability for a given input x in accordance with a predetermined probability distribution on the sum space. The output probability from the part 104 is supplied to the output part 102, so that the output vector y having M data elements is produced by the output part 102. The parameter learning part 103 performs the learning of each parameter defining the probability distribution of the part 104.

In the learning system shown in FIG. 15, an input-output relationship is predetermined in which any input and output samples are distributed according to a prescribed probability density function $P(w; x, y)$ on the sum space. The output probability determining part 104 has a parameter storage part 105 and a conditional probability estimation part 106. In the parameter storage part 105, a set of parameters w for defining the probability density functions $P(w; x, y)$ is stored. The conditional probability estimation part 106 defines the probability density function $P(w; x, y)$ in accordance with each parameter of the parameter storage part 105, and produces a conditional probability distribution $P(w; y|x)$ of the output y for a given input x in accordance with the function $P(w; x, y)$, as follows.

$$P(w; y|x) = P(w; x, y) / \int P(w; x, y') dy' \quad (39)$$

Determination of the conditional probability distribution in this procedure is made similarly to that of the second embodiment using formulas (4) and (5).

In order to produce a desired output probability for a given input, it is necessary to set the parameter w, stored in the parameter storage part 105, to an appropriate value. The parameter learning part 103 in this embodiment is provided to perform the learning of the parameters w for this purpose. The parameter learning part 103, as shown in FIG. 15, includes a data storage part 107, a clustering part 108, and a parameter computing part 109.

In the data storage part 107, teaching data having a set of given inputs xs and desired outputs ys [(xs, ys), s=1, . . . ,S]

is stored. The clustering part 108 performs clustering of the teaching data on the sum space of the input space and output space. In other words, the clustering part 108 classifies the teaching data of the data storage part 107 into a number of clusters. As a result of the clustering by the clustering part 108, statistical quantities of the clusters are determined. The parameter computing part 109 computes parameters in accordance with the statistical quantities of the clusters from the clustering part 108. The parameters from the parameter computing part 109 are stored in the parameter storage part 105.

In the clustering part 108 of the learning system shown in FIG. 15, the clustering is performed by using either a non-hierarchical technique such as K-mean method or a hierarchical technique such as Ward method. Generally, when the non-hierarchical technique is used, the number H of clusters is preset at the start of the clustering. In contrast, when the hierarchical technique is used, the number H of clusters changes from an initial value step by step, and the final value of the number H is determined at the end of the clustering.

The data of clusters obtained as the result of the clustering by the clustering part 108 is in accordance with a prescribed statistical distribution such as a normal distribution. The parameter computing part 109 computes a parameter for each cluster in accordance with the statistical distribution of the data of that cluster from the clustering part 108, and outputs the resulting parameter to the parameter storage part 105.

In the output probability determining part 104, the approximation of each probability density function P(w; x, y) is made from the linear combination of probability data in accordance with the probability distribution for each probability density function. It is desirable that one of such probability distributions in the determining part 104 corresponds to one of the clusters in the parameter learning part 103. Thus, it is desirable that the number of clusters in the parameter learning part 103 is the same as the number of linear combinations corresponding to the probability distributions in the determining part 104.

When the clustering part 108 performs the clustering using the non-hierarchical technique, the number H of clusters can be preset to the number of the linear combinations in the determining part 104. The clustering part 108 classifies the teaching data (xs, ys) of the storage part 107 into clusters, the number H of clusters being the same as the number of the linear combinations in the determining part 104.

However, when the hierarchical technique is used in the clustering of the teaching data by the parameter learning part 103, the number of clusters changes step by step during the clustering. Therefore, it is necessary that the number of the linear combinations corresponding to the probability distributions in the determining part 104 is set to the final value of the number H of clusters at the end of the clustering by the clustering part 108.

When the teaching data (xs, ys) from the data storage part 107 is classified into clusters by the clustering part 108 using either of the two techniques mentioned above, the parameter computing part 109 computes parameters in accordance with the statistical quantities of the clusters from the clustering part 108.

More specifically, when the data of the clusters from the clustering part 108 is in accordance with a normal distribution, the parameter computing part 109 produces the average mh of the data of the clusters Ah (h=1, ..., H) and the standard deviation matrix σh, and produces a parameter of the normal distribution for each cluster from the average mh and the standard deviation matrix σh. Also, in the parameter computing part 109, coefficients Ch with respect to the linear combinations are, respectively, determined from the number of teaching data in each cluster divided by the total number of the teaching data. The parameter computing part 109 outputs the resulting parameter w= (Ch, σn, mh) to the parameter storage part 105 of the determining part 104 for each cluster.

In the output probability determining part 104, when the teaching data of each cluster Ah from the clustering part 108 is in accordance with normal distribution, the probability density function P(w; x, y) is determined from the linear combination of the normal distribution, as follows.

$$P(w; x, y) = \sum_{h=1}^{H} C_h \times \qquad (40)$$

$$(2\pi)^{-(M+N)/2} |\sigma_h|^{-1/2} \cdot \exp\{-(1/2) \cdot (Z - m_h)' \sigma_h^{-1} (Z - m_h)\}$$

In this formula, Z denotes the data (x, y) and w denotes the set (Ch, σh, mh). The actual distribution of the teaching data on the input-output sum space is approximated by the linear combination of the normal distribution. Based on the approximated distribution, the conditional probability distribution P(w; y|x) is determined according to formula (39).

When Ward method is used as the hierarchical technique in the clustering of the teaching data by the clustering part 108, the number H of clusters changes, step by step, during the clustering, and is finally determined at the end of the clustering. At the start of the clustering, it is assumed that each item of the teaching data has one cluster, and thus the number of clusters is the same as the total number of items of the teaching data. The number of clusters is reduced step by step by linking two out of those clusters. Each time two clusters are linked, the following estimation function E is computed, and the value of the estimation function E increases by the minimum value.

$$E = \sum_{h=1}^{H} E_h \qquad (41)$$

$$E_h = \sum_{v=1}^{nh} x_{h,v} - (x_h)_m^2$$

In this formula, Xh,v (v=1, ... ,nh) is the data of each cluster Ch (h=1, ... ,H) and (Xh)m is the average of the data of the clusters Ch. The number H of clusters is thus reduced by the linking of two clusters, and the total number of clusters is finally determined at the end of the clustering.

Figure 16:
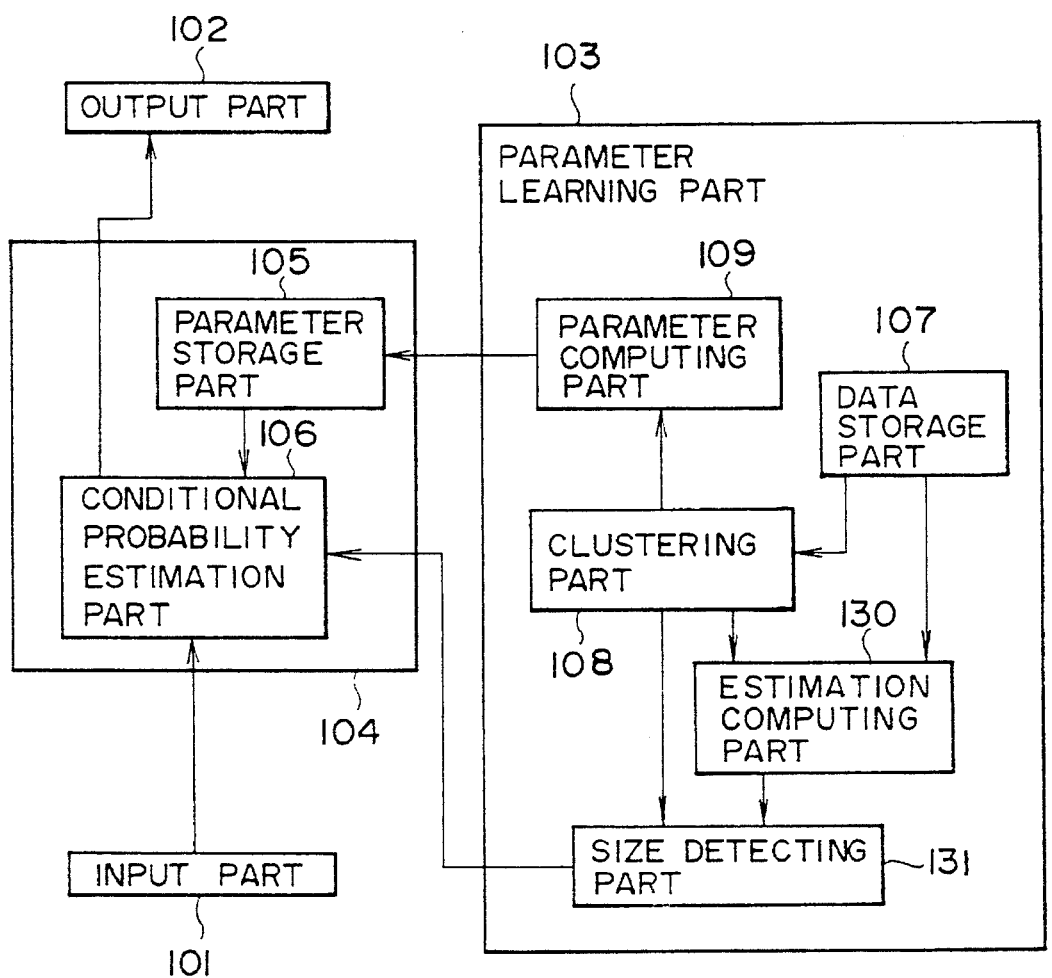
FIG. 16 is a block diagram showing an example of the learning system of the third embodiment in which the clustering of data is performed using a hierarchical technique.

FIG. 16 shows a neural network learning system of the third embodiment described above in which the clustering of data is performed using the hierarchical technique such as Ward method. In the learning system shown in FIG. 16, the parts which are the same as the corresponding parts of the learning system shown in FIG. 15 are denoted by the same reference numerals, and a description thereof will be omitted.

The parameter learning part 103 shown in FIG. 16 further includes an estimation computing part 130 and a size detecting part 131. When the clustering part 108 performs the clustering of teaching data by using the hierarchical technique such as Ward method, the estimation computing part 130 computes the value of the estimation function E of formula (41) each time two clusters are linked during the clustering performed by the clustering part 108. The size detecting part 131 detects whether or not the value of the estimation function E from the estimation computing part 130 is greater than a prescribed threshold value. When it is detected that the value of the estimation function E is greater than the threshold value, the clustering of the teaching data by the clustering part 108 ends.

The number H of the linear combinations in the output probability determining part 104 is determined as being the number of clusters at the end of the clustering. Thus, in the neural network learning system shown in FIG. 16 wherein the number of clusters varies in the clustering process, it is possible that the number of the linear combinations in the determining part 104 (i.e., the number of parameters for defining the probability distributions) can be easily determined by the use of the estimation computing part 130 and the size detecting part 131. Thus, the cluster size in the neural network can be easily and reliably determined.

In the third embodiment described above, the input-output relationship is inferred by using the probability density function. The parameter for defining each probability density function can be easily and quickly obtained via the learning, and the learning of the parameter to detect its optimal value is achieved by readily convergent clustering and simple statistic quantity computation. The time consuming inference performed in the known error back-propagation method is not required, and the learning time is remarkably reduced and the optimal value of the parameter can be reliably found after learning. A plurality of desired outputs for a given input can be obtained in accordance with the probability density function according to formula (39). For example, when the above described learning system is applied to character recognition, it is possible that the maximum value is selected from among the output probabilities resulting from the character recognition and the others are rejected.

Figure 17:
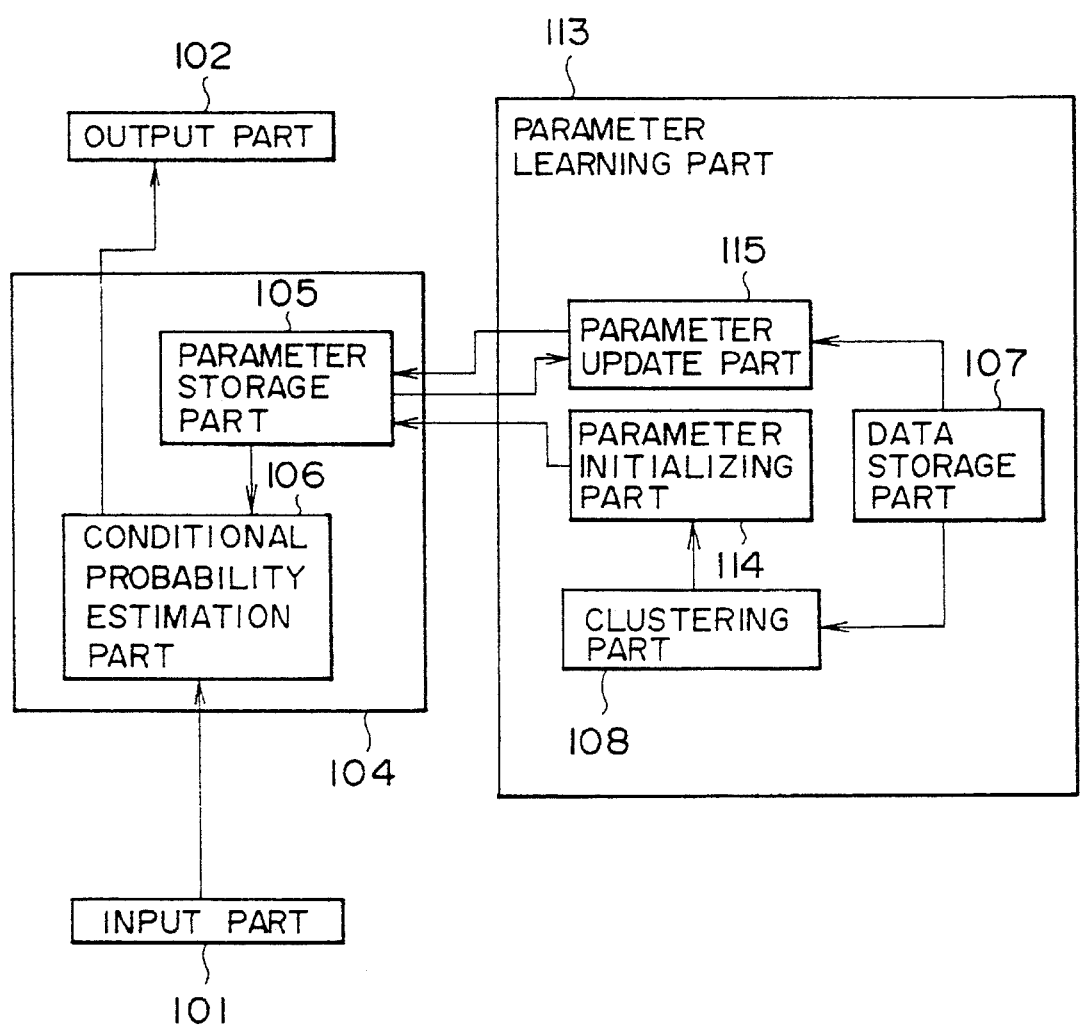
FIG. 17 is a block diagram showing a fourth embodiment of the learning system according to the present invention.

FIG. 17 shows a fourth embodiment of the learning system according to the present invention. In FIG. 17, the parts which are the same as the corresponding parts shown in FIG. 15 are designated by the same reference numerals, and a description thereof will be omitted. In the learning system shown in FIG. 17, a parameter learning part 113 includes the data storage part 107, the clustering part 108, a parameter initializing part 114, and a parameter update part 115.

The parameter initializing part 114 shown in FIG. 17 corresponds to the parameter computing part 109 shown in FIG. 15. This part performs a process similar to the process performed by the parameter computing part 109. In the parameter initializing part 114, parameters are computed in accordance with the statistical quantities of the clusters from the clustering part 108. The parameters from the parameter initializing part 114 are stored in the parameter storage part 105 as the initial values of the parameters.

More specifically, when the data of the clusters from the clustering part 108 is in accordance with a normal distribution, the parameter initializing part 114 produces the average mh of the data of the clusters Ah, the standard deviation matrix σh thereof, and the coefficients Ch of the linear combinations, so that a parameter of the normal distribution for each cluster is produced. The parameter initializing part 114 outputs the resulting parameter w=(Ch, σh, mh), as the initial value, to the parameter storage part 105, so that the initial values of the parameters from the part 114 are stored in the parameter storage part 105.

The parameter update part 115 shown in FIG. 17 corresponds to the probability density determining part 11 shown in FIG. 2. This part 115 performs a process similar to the process performed by the determining part 11. Starting from the initial values of the parameters stored in the parameter storage part 105, the parameter update part 115 performs the updating of the parameters defining the probability density function by using the maximum likelihood method, and finally determines the optical values of the parameters as the result of the inference performed according to the maximum likelihood method.

As described above, in the learning system shown in FIG. 17, after the clustering of the teaching data stored in the data storage part 107 is performed by the clustering part 108, the parameter initializing part 114 determines parameters defining the probability density function P(w; x, y) in accordance with the statistical quantities of the clusters from the clustering part 108. The initial values of the parameters from the parameter initializing part 114 are thus stored in the parameter storage part 105.

Starting from the initial values of the parameters stored in the parameter storage part 105, the parameter update part 115 computes the logarithm likelihood function of probabilities L(w) for a set of given input and output samples [xs, ys] (s=1, 2, ..., N), as follows.

$$L(w) = \sum_{s=1}^{S} \log P(w; x_s, y_s) \quad (42)$$

By applying the maximum likelihood method to the probability function L(w) of formula (42), the parameters are updated from the initial values so as to satisfy the required condition that the function L(w) has the maximum value, in accordance with the following rule derived from the above formula (42).

$$dw/dt = \partial L(w)/\partial w \quad (43)$$
$$= \sum_{s=1}^{S} [\partial P(w; x_s, y_s)/\partial w]/P(w; x_s, y_s)$$

The maximum value of the function L(w) can be obtained by finding a value of each parameter such that the parameter differential dw according to formula (43) having that value of the parameter is smaller than a predetermined reference value "E" through the maximum likelihood method.

When the parameter differential dw according to formula (43) is smaller than the reference value "E", it is determined that the corresponding parameter has converged sufficiently, and the updating of the parameter is stopped. In this manner, the values of the parameters w are finally determined by the parameter update part 115 through the maximum likelihood method, so that the values of the parameters w are stored in the parameter storage part 105. Thus, the output probability determining part 104 can carry out the inference of the input-output relationship (such as the actual character recognition) by using the values of the parameters stored in the parameter storage part 105.

In the fourth embodiment described above, the initial values of parameters, which are the optimal values obtained as a result of the clustering of teaching data, are updated according to the maximum likelihood method to find global maximum values of the parameters, and it is possible to remarkably eliminate the problem of the known error back-propagation method (namely, local maximum values of the parameters found). The convergence of the parameters to the optimal maximum values can be smoothly and reliably achieved, and the learning of the parameters according to the maximum likelihood method is reliable and speedy.

In the fourth embodiment described above, it is possible that, even if the number of clusters varies during the clustering of teaching data due to the use of the hierarchical technique such as Ward method, the number of the linear combinations in the determining part 104 (i.e., the number of parameters for defining the probability distributions) can be easily determined similarly to the case of the learning system shown in FIG. 16.

Figure 18:
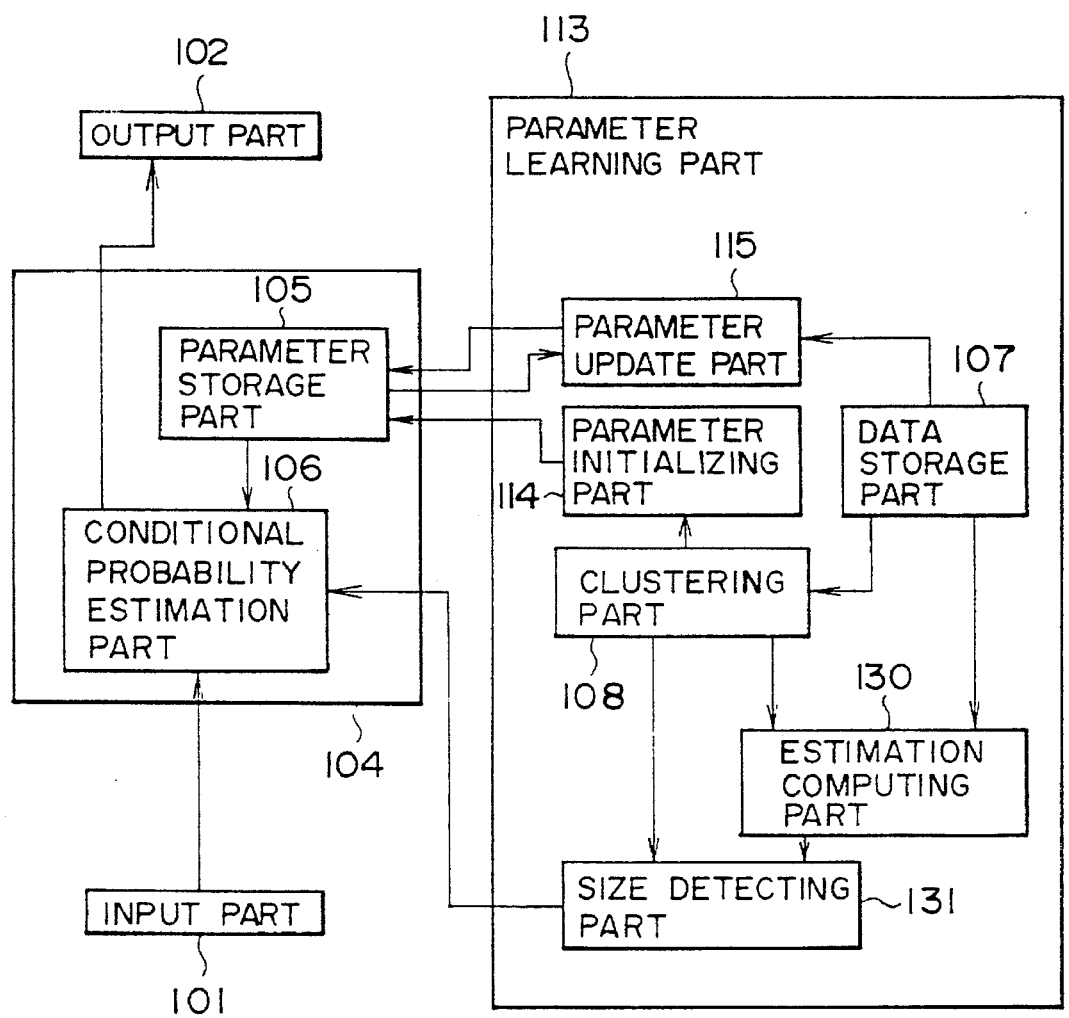
FIG. 18 is a block diagram showing an example of the learning system of the fourth embodiment in which the clustering of data is performed using the hierarchical technique.

In the learning system shown in FIG. 18, the parameter learning part 113 further includes the estimation computing part 130 and the size detecting part 131. In FIG. 18, the parts which are the same as the corresponding parts shown in FIG. 17 are denoted by the same reference numerals. When the clustering part 108 performs the clustering of teaching data by using the hierarchical technique such as Ward method, the estimation computing part 130 computes the value of the estimation function E each time two clusters are linked during the clustering by the clustering part 108. The size detecting part 131 detects whether or not the value of the estimation function E from the estimation computing part 130 is greater than a prescribed threshold value. When it is detected that the value of the estimation function E is greater than the threshold value, the clustering of the teaching data by the clustering part 108 is stopped.

The number H of the linear combinations in the output probability determining part 104 is determined as being the number of clusters at the end of the clustering. Thus, in the neural network learning system shown in FIG. 18, it is possible that the number of the linear combinations in the determining part 104 (i.e., the number of parameters for defining the probability distributions) can be easily determined. Thus, the size of clusters in the neural network can be easily determined.

In the above described third and fourth embodiments, the clustering of teaching data is performed by using either the non-hierarchical classifying technique such as K-mean method or the hierarchical classifying technique such as Ward method. However, it is difficult to achieve the optimal clustering of teaching data for any kind of the data because the items of data of clusters obtained in the clustering have different configurations (such as the data features, or the data distributive structure).

Next, a description will be given of a data analyzing device used in the learning system of the present invention in which the optimal clustering of data is performed even if the items of data of clusters have different configurations.

Figure 19:
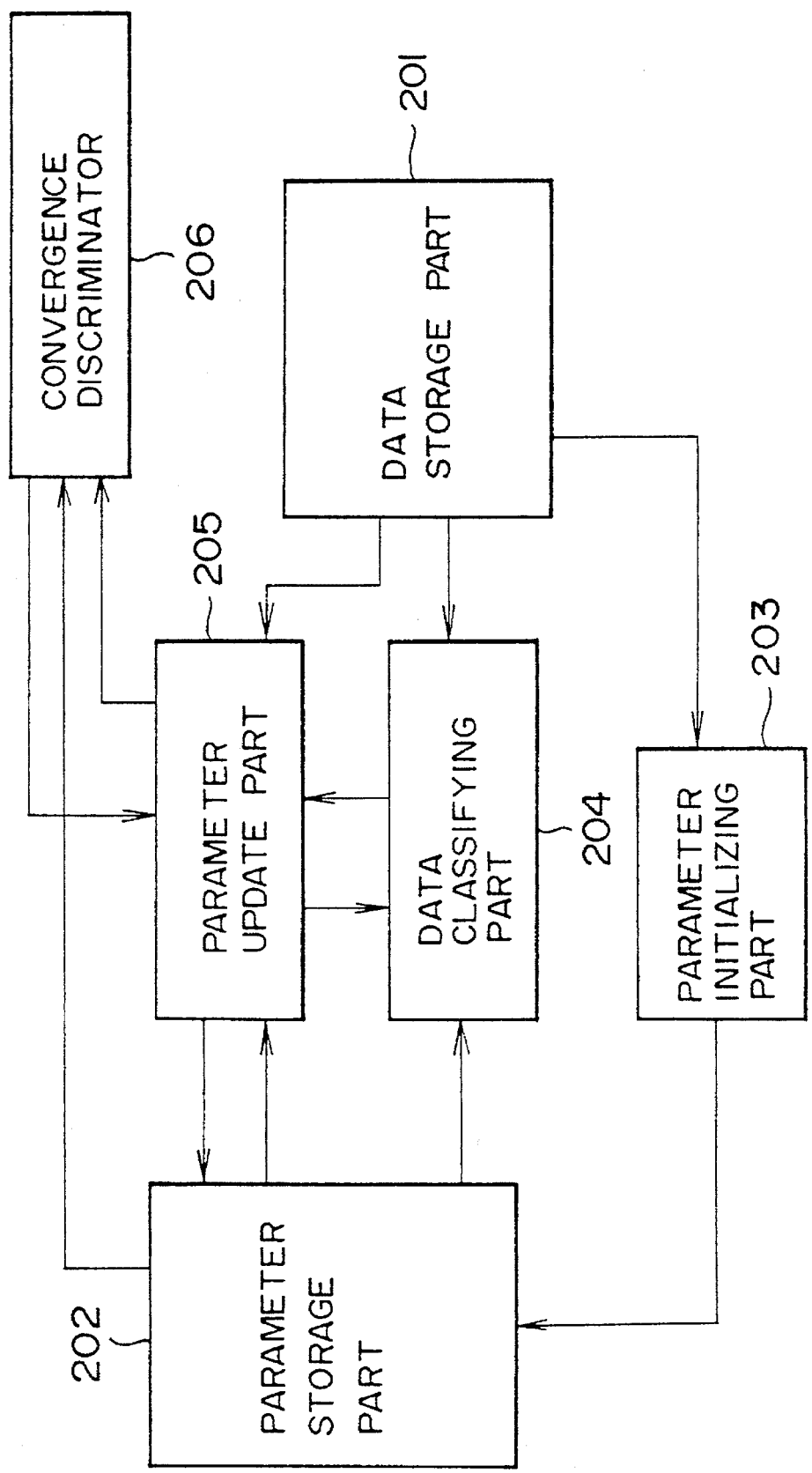
FIG. 19 is a block diagram showing a data analyzing device used in the learning system according to the present invention.

FIG. 19 shows a data analyzing device used in the learning system according to the present invention. This data analyzing device is applicable to the data analysis for the design of a character recognizing system, voice recognizing system or image recognizing system, or to the statistical data analysis of multi-dimensional data in psychological or medical science.

In the data analyzing device shown in FIG. 19, there are a data storage part 201, a parameter storage part 202, a parameter initializing part 203, a data classifying part 204, a parameter update part 205, and a convergence discriminator 206. In the data storage part 201, a set of data which is subjected to the clustering mentioned above is stored. The data classifying part 204 classifies the data, stored in the data storage part 201, into a number of clusters. In the parameter storage part 202, a plurality of parameters is stored for the clusters, each parameter defining the probability distribution (such as normal distribution) of the data stored in the data storage part 201. Before the clustering of the data is performed, the parameter initializing part 203 determines the initial values of the parameters from the data in the data storage part 201, and stores the initial values of the parameters for the respective clusters in the parameter storage part 202.

The data classifying part 204 obtains a probability distribution of the data in the data storage part 201 for each cluster in accordance with the parameters stored in the parameter storage part 202, and classifies the data stored in the data storage part 201 into a number of clusters in accordance with the probability distribution of the data, so that the allocation of the data to the clusters is determined. The parameter update part 205 updates the parameters in the parameter storage part 202. The convergence discriminator 206 stops the updating of the parameters when a prescribed discrimination criterion is satisfied, so that the clustering of the data is completed.

Next, the operation performed by the data analyzing device shown in FIG. 19 will be described. In the data storage part 201, a set of data [(xs), $1 \leq s \leq S$] is stored, each of the data xs being vector data having N data elements. For the sake of convenience, it is assumed that the set of data in the data storage part 201 is in accordance with the normal distribution, and that a plurality of "K" clusters are preset in accordance with the normal distribution of the data.

In the parameter storage part 202, "K" parameters wh=(mh, σh, Ch) ($1 \leq h \leq K$) are stored, each parameter defining the normal distribution for one of "K" clusters Ah ($1 \leq h \leq K$). In each of the parameters wh stored in the parameter storage part 202, "mh" is the average, "σh" is the standard deviation, and "Ch" is the coefficient indicating the approximate frequency at which the data is allocated to the cluster Ah. The parameters wh are determined according to the probability distributions Ph indicated by this probability density function:

$$P(w; x) = \sum_{h=1}^{K} P_h(w_h; x) \qquad (44)$$

$$P_h(w_h; x) = C_h N(m_h, \sigma_h)(x)\chi[B_h(x)]$$

One of the probability distributions corresponds to one of the clusters obtained through the clustering of the data. In other words, the number K of linear combinations accords with the number of clusters Ah. In the above formula (44), "N(mh, σh) (x)" is the density set of the normal distribution of the average matrix mh and the standard deviation matrix σh, and "Bh (x)" is the set of the inputs x in which the following conditions are satisfied by the value of the inputs x.

$$B_h(x) = \{x | C_h N(m_h, \sigma_h)(x) \geq C_j N(m_j, \sigma_j)(x), 1 \leq j \leq K\} \qquad (45)$$

"X [Bh (x)]" in formula (44) is the characteristic function of the set Bh (x) in formula (45). Here, the likelihood function L'(w) with respect to the probability distribution P(w; x) according to formula (44) is defined as follows.

$$L'(w) = \prod_{s=1}^{S} \left( \sum_{h=1}^{K} P_h(w_h; x_s) \right) \qquad (46)$$

Assuming that one item of the input data xs in one of the clusters Ah meets the requirement: Ph (wh; xs) is not equal to 0, the following likelihood function L'(w) is derived.

$$L(w) = \sum_{s=1}^{S} \log P_h(w_h; x_s) \qquad (47)$$

In this formula, xs is an element of the set Bh of formula (45).

Before the actual clustering of the data is started, the parameter initializing part 203 determines the initial values of the parameters wh= (mh, σh, Ch) ($1 \leq h \leq K$).

After the initial values of the parameters wh are stored in the parameter storage part 202, the data classifying part 204 and the parameter update part 205 alternatively perform the clustering process (the data being classified into clusters) and the parameter updating process.

More specifically, the data classifying part 204 reads out each item of data xs from the data storage part 201, and computes the value of Ph (wh; xs) for each of the clusters Ah ($1 \leq h \leq K$) based on the parameters wh stored in the parameter storage part 202. The data classifying part 204 detects what cluster corresponds to the maximum value of Ph (wh; xs) among the computed values of Ph (wh; xs) for the respective clusters Ah. For example, when the n-th cluster Ah corresponds to the maximum value of Ph (wh; xs), the data classifying part 204 determines that the data item xs belongs to the n-th cluster Ah.

After the clustering of the data as mentioned above is performed for all the data in the data storage part 201, the parameter update part 205 computes the average mh and standard deviation oh of data belonging to each of the clusters Ah. Based on the results of the computation, the parameter update part 205 updates the parameters "mh" and "oh" in the parameter storage part 202. Also, with respect to the coefficient Ch, the number of items of data belonging to each of the clusters is divided by the total number "S" of items of data in the data storage part 201, so that the resulting value becomes the updated value of the coefficient Ch of the parameter.

After the parameter updating process mentioned above is performed, the data classifying part 204 again performs the clustering process with the data stored in the data storage part 201 based on the updated parameters wh stored in the parameter storage part 202 in a manner similar to that previously described above. After the clustering process is performed, the parameter update part 205 again performs the parameter updating process based on the data of the resulting clusters.

Due to the repeated procedure of alternatively performing the clustering process and the parameter updating process as mentioned above, the value of the logarithm likelihood function L'(w) of formula (47) is increased step by step. When the parameters wh are determined or fixed, the data classifying part 204 allocates the data xs to the clusters such that the function Ph (wh; xs) has the maximum value. Thus, the value of the function L'(w) is increased. In the meantime, when the classification of data in the clusters is determined or fixed, the parameter update part 205 updates the average "mh" and standard deviation "oh" of the parameters in the parameter storage part 202 such that they become the average and standard deviation for the clusters. The value of the function L'(w) is increased step by step, according to a well known principle of the maximum likelihood method when it is applied to the normal distribution.

The convergence discriminator 206 shown in FIG. 19 detects whether or not a prescribed discrimination criterion is satisfied. When it is detected that the criterion is satisfied, the convergence discriminator 206 instructs the parameter update part 205 to stop the updating of the parameters in the parameter storage part 202, so that the parameters stored in the parameter storage part 202 are finally determined. After the updating of the parameters is stopped, the data classifying part 204 performs the clustering of the data at one time based on the finally determined parameters in the parameter storage part 202, so that the data xs of the clusters is finally determined.

Figure 20:
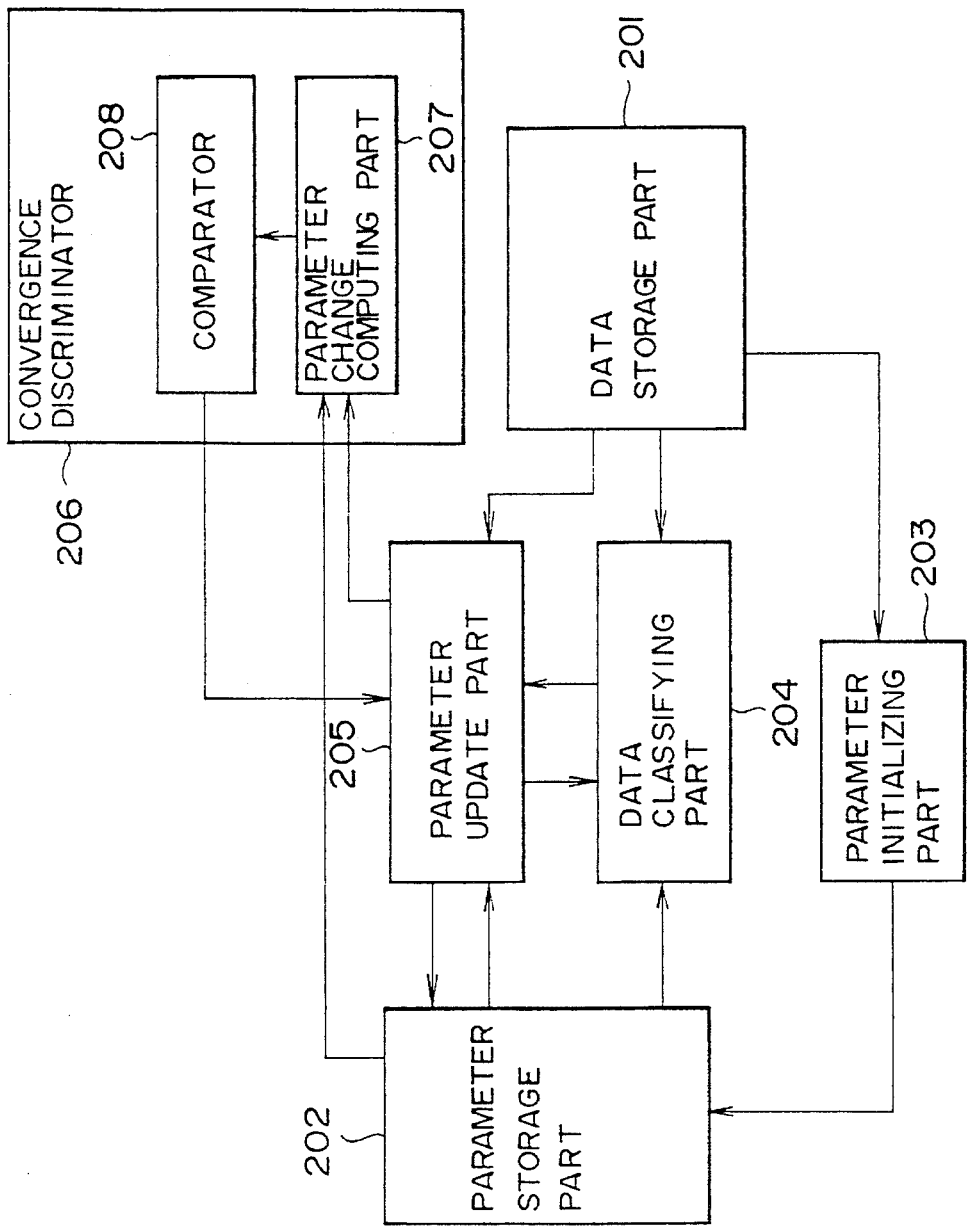
FIG. 20 is a block diagram showing a construction of a convergence discriminator of the data analyzing device shown in FIG. 19.

FIG. 20 shows a construction of the convergence discriminator of the data analyzing device shown in FIG. 19. In FIG. 20, the parts which are the same as the corresponding parts shown in FIG. 19 are denoted by the same reference numerals. In the convergence discriminator 206 shown in FIG. 20, a parameter change computing part 207 and a comparator 208 are provided. The parameter change computing part 207 determines change from the sum of squares of weighted errors of the parameters previously stored (before the updating) in the parameter storage part 202 to the sum thereof computed from the parameters currently stored in the part 202 after the updating is performed. The comparator 208 detects whether or not the change obtained by the parameter change computing part 207 is smaller than a prescribed threshold value TH1. When it is detected that the change is smaller than the value TH1, it is judged that the convergence criterion has been met. The comparator 208 at that time instructs the parameter update part 205 to stop the updating of the parameters.

Figure 21:
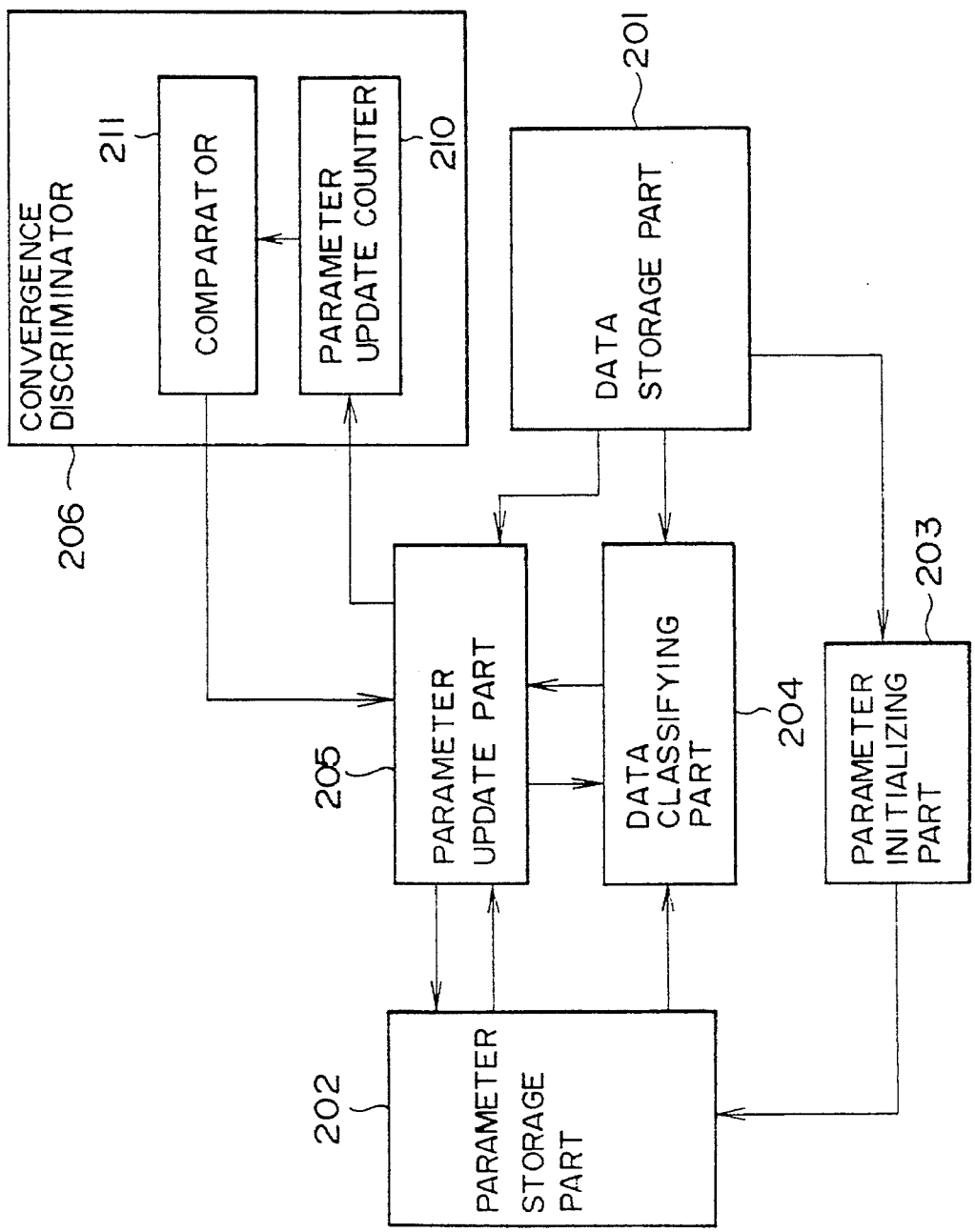
FIG. 21 is a block diagram showing another construction or the convergence discriminator of the data analyzing device shown in FIG. 19.

FIG. 21 shows another construction of the convergence discriminator which can be used in the data analyzing device shown in FIG. 19. In FIG. 21, the parts which are the same as the corresponding parts shown in FIG. 19 are denoted by the same reference numerals. In the convergence discriminator 206 shown in FIG. 21, a parameter update counter 210 and a comparator 211 are provided. The parameter update counter 210 increments a count indicating the number of updating attempts the parameter each time the updating process is performed by the parameter update part 205.

The comparator 211 detects whether or not the count obtained by the parameter update counter 210 is greater than a prescribed threshold value TH2. When it is detected that the count is greater than the value TH2, it is judged that the convergence criterion has been met. The comparator 211 at that time instructs the parameter update part 205 to stop the updating of the parameters.

In the above described data analyzing devices shown in FIGS. 19 to 21, the parameters defining the probability density function for the items of data in each cluster are updated according to the result of the clustering of the data. Thus, it is possible to achieve the optimal clustering of the data for any kind of data even if the items of data of clusters obtained in the clustering have different configurations such as the data features, or the data distributive structure. Due to the updating of the parameters, it is possible to clarify the configurations of the data of the clusters so that the optimal clustering of the data can be performed.

Figure 22:
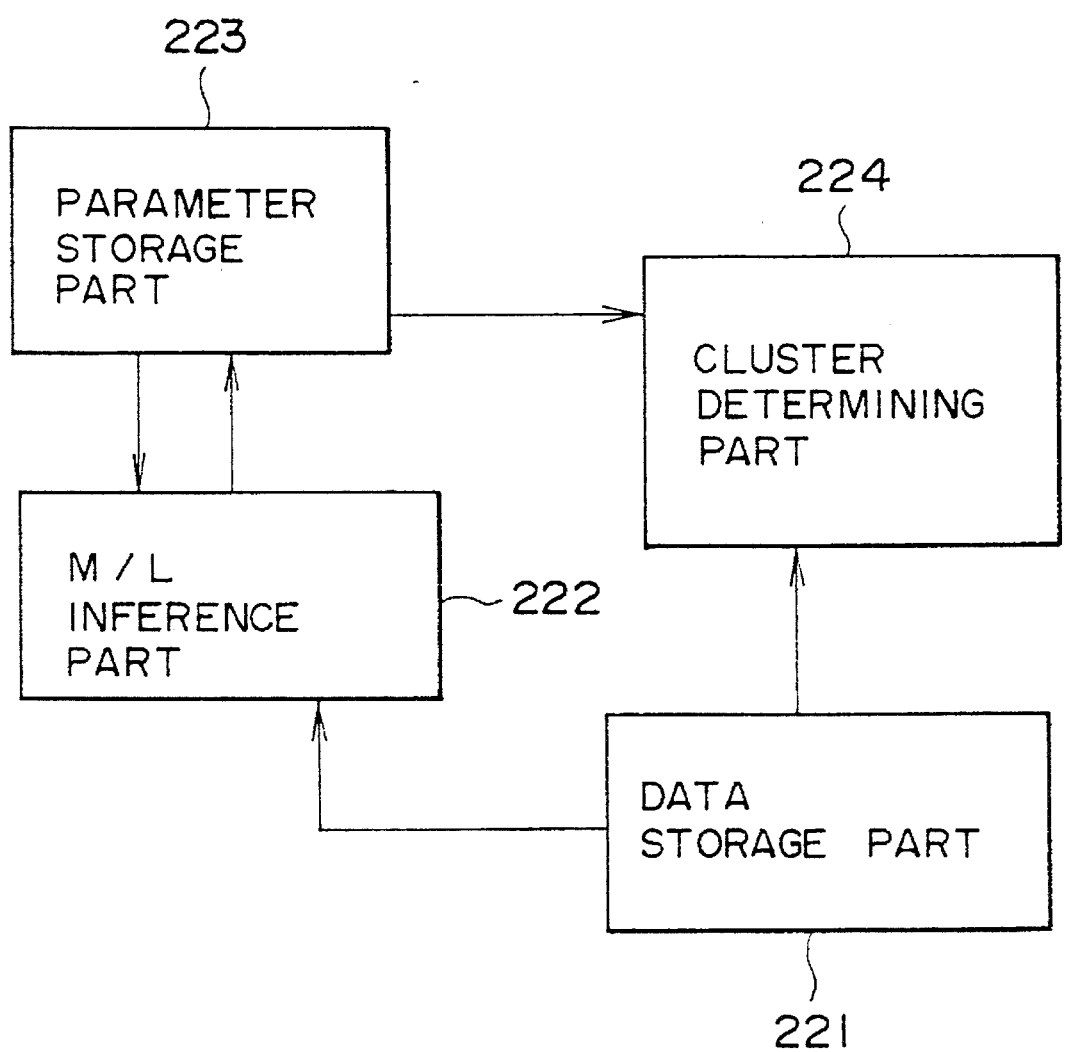
FIG. 22 is a block diagram showing another data analyzing device used in the learning system according to the present invention.

FIG. 22 shows another data analyzing device used in the learning system of the present invention, wherein the optimal clustering of data is performed even if the items of data of clusters have different configurations.

In the data analyzing device shown in FIG. 22, there are a data storage part 221, a maximum likelihood (M/L) inference part 222, a parameter storage part 223, and a cluster determining part 224. In the data storage part 221, a set of data which is subjected to the clustering is stored. The M/L inference part 222 determines parameters for defining distributions for the data in the data storage part 221 through the maximum likelihood method mentioned above.

In the parameter storage part 223 shown in FIG. 22, the parameters from the maximum likelihood inference part 222 are stored for the clusters, each parameter defining the probability distribution (such as normal distribution) of the data stored in the data storage part 221. Based on the parameters stored in the parameter storage part 223, the cluster determining part 224 estimates the probability distributions of the data stored in the data storage part 221 for each of clusters, and determines which cluster the data belongs to in accordance with the results of the estimation of the probability distribution thereof.

Next, the operation performed by the data analyzing device shown in FIG. 22 will be described. Similarly to the data analyzing device shown in FIG. 19, in the data storage part 221, a set of data [(xs), 1≦s≦S] is stored. It is assumed that the set of data is the samples distributed in accordance with the probability distributions of the probability density functions indicated by the linear combinations of normal distributions. The probability distributions are represented by the following formula.

$$P(w, x) = \sum_{h=1}^{K} C_h N(m_h, \sigma_h)(x) \quad (48)$$

$$N(m_h, \sigma_h)(x) =$$

$$(2\pi)^{-N/2} \cdot |\sigma_h|^{-1/2} \cdot \exp\{-(1/2) \cdot (x - m_h)' \sigma_h^{-1}(x - m_h)\}$$

One of the clusters corresponds to one of the normal distributions. It is assumed that the number of clusters is preset to the number "K" of the linear combinations according to the normal distributions. In the parameter storage part 223, "K" parameters wh=(mh, σh, Ch) (1≦h≦K) are stored, each parameter defining the normal distribution for one of "K" clusters Ah (1≦h≦K).

"N (mh, σh) (x)" in formula (48) is the function indicating the normal distribution, "mh" is the average matrix, and "σh" is the standard deviation matrix. Also, "Ch" is the coefficient of the linear combinations of the normal distributions.

From the data stored in the data storage part 221, which is the samples distributed in accordance with the probability distribution of formula (48), the M/L inference part 222 obtains the optimal values of the parameters for the data. The optimal values of the parameters can be obtained by finding the parameters w when the following logarithm likelihood function L2 (w) has the maximum value.

$$L_2(w) = \sum_{s=1}^{S} \log P(w; x_s) \quad (49)$$

In order to find the parameters w when the function L2(w) according to formula (49) has the maximum value, the maximum likelihood method is applied as described above.

$$w(n+1) = w(n) + \alpha \sum_{s=1}^{S} \frac{\partial}{\partial w} P(w; x_s)|_{w=w(n)} \quad (50)$$

When the maximum likelihood method is applied, the parameters w are updated according to the updating rule of formula (50).

The procedure performed according to the updating rule mentioned above is repeated until a prescribed convergence criterion is satisfied, so that the optimal values of the parameters w can be obtained. Thus, the M/L inference part 222 obtains the optimal values of the parameters wh=(mh, σh, Ch) (1≦h≦K).

When the optimal values of the parameters wh are determined by the M/L inference part 222, they are stored in the parameter storage part 223 for each cluster. Based on the parameters wh stored in the parameter storage part 223 for each cluster, the cluster determining part 224 determines the values of the respective clusters Ah (1≦h≦K). More specifically, the value (the distribution data) of Ch N (mh, σh) (xs) (1≦h≦K) can be determined for each cluster in response to the data xs in the data storage part 221. For example, when the above mentioned value for the n-th cluster is the maximum, it is judged the data xs belongs to the cluster Ah.

In the data analyzing device shown in FIG. 22, the clustering of the data is carried out through the inference of the probability distribution of the data, and it is possible to achieve the optimal clustering of the data for any kind of data even if the items of data of clusters obtained in the clustering have different configurations. Due to the inference of the probability distribution of the data, it is possible to clarify the configurations of the data of the clusters so that the optimal clustering of the data can be easily and reliably performed.

Further, the present invention is not limited to the above described embodiments, and variations and modifications may be made without departing from the scope of the present invention.

What is claimed is:

1. A neural network learning system for inferring an input-output relationship from a set of given input and output samples, comprising:
   a) probability density means for determining a probability density on a sum space of an input space and an output space from the set of given input and output samples by learning a value of a parameter through a prescribed maximum likelihood method;
   b) inference means for determining a probability density function based on the probability density from said probability density means, to infer the input-output relationship of the samples from the probability density function; wherein the learning a value of the parameter is repeated by said inference means until a value of a predefined parameter differential function using the prescribed maximum likelihood method is smaller than a prescribed value, thereby determining said parameter value;
   c) conditional probability distribution means for computing a conditional probability distribution from either the given input samples or the given output samples in accordance with the probability density function determined by said inference means; and
   d) output means for obtaining an inference value based on the conditional probability distribution from said conditional probability distribution means and for outputting said inference value.

2. A neural network learning system according to claim 1, wherein said probability density is derived from a linear combination of exponential functions exp (−φ(w, x, y)) with respect to the given input and output samples, where w is the probability density function parameter, x is an input vector, y is an output vector and φ is an arbitrary function indicating a relationship between w and x and y.

3. A neural network learning system according to claim 1, wherein the input and output samples are distributed on the sum space in accordance with a normal distribution, and said probability density is derived from a linear combination of normal distributions with respect to the input and output samples, said normal distributions defined by Gaussian type exponential functions.

4. A neural network learning system according to claim 1, wherein said conditional probability distribution computed in accordance with the probability density function is a probability function P(w; y|x), where y|x indicates a relationship between y and x, and said output means obtains an average of outputs y in accordance with said function P(w; y|x) for a given input x as said inference value so that said average of the outputs y is output by said output means.

5. A neural network learning system according to claim 1, wherein said conditional probability distribution computed in accordance with the probability density function is a probability function P(w; y|x), where y|x indicates a relationship between y and x, and said output means obtains and outputs a set of outputs y of said function P(w; y|x) for a given input x together with a set of output probabilities P(w; y|x) corresponding to the respective outputs y.

6. A neural network learning system according to claim 1, wherein said conditional probability distribution computed in accordance with the probability density function is a function P(w; x|y), where x|y indicates a relationship between x and y, and said output means obtains an average of inputs x in accordance with said function P(w; x|y) for a given output y as said inference value so that said average of the inputs x is output by said output means.

7. A neural network learning system according to claim 1, wherein a probability of occurrence for a given input is obtained based on the probability density of said probability density means, so that said output means determines and outputs the inference value for said given input based on said probability of occurrence.

8. A neural network learning system according to claim 1, wherein a probability of occurrence for a given output is determined based on the probability density of said probability density means, so that said output means determines and outputs the inference value for the given output based on said probability of occurrence.

9. A neural network learning system according to claim 1, wherein said probability density is derived from the linear combination of exponential functions exp $(-\phi(w, x, y))$ with respect to the given input and output samples, where w is a parameter, x is an input vector, y is an output vector and $\phi$ is an arbitrary function indicating a relationship between w, x, and y.

10. A neural network learning system according to claim 1, wherein the input and output samples are distributed on the sum space in accordance with a normal distribution, and said probability density is derived from a linear combination of normal distributions with respect to the input and output samples, said normal distributions defined by Gaussian type exponential functions.

11. A neural network learning system for inferring an input-output relationship from a set of given input and output samples, comprising:
 a) probability density means for determining a probability density on a sum space of an input space and an output space from the set of given input and output samples by learning a value of a parameter through a prescribed maximum likelihood method;
 b) inference means for determining a probability density function based on the probability density from said probability density means, to infer the input-output relationship of the samples from the probability density function; wherein the learning a value of the parameter is repeated by said inference means until a value of a predefined parameter differential function using the prescribed maximum likelihood method is smaller than a prescribed value, thereby determining said parameter value;
 c) conditional probability distribution means for computing a conditional probability distribution from either the given input samples or the given output samples in accordance with the probability density function determined by said inference means; and
 d) output means for obtaining an inference value based on the conditional probability distribution from said conditional probability distribution means and for outputting said inference value;
 wherein:
  1) said conditional probability distribution computed in accordance with the probability density function is an input distribution function P(w; x|y),
  2) x|y indicates a relationship between x and y, and
  3) said output means determines and outputs a set of inputs x in accordance with said function P(w; x|y) for a given output y, and a set of values of said function P(w; x|y) corresponding to the respective inputs x.

12. A neural network learning system for inferring an input-output relationship from a set of given input and output samples, comprising:
 a) probability density means for determining a probability density on a sum space of an input space and an output space from the set of given input and output samples by learning a value of a parameter through a prescribed maximum likelihood method;
 b) inference means for determining a probability density function based on the probability density from said probability density means, to infer the input-output relationship of the samples from the probability density function; wherein the learning a value of the parameter is repeated by said inference means until a value of a predefined parameter differential function using the prescribed maximum likelihood method is smaller than a prescribed value, thereby determining said parameter value;
 c) conditional probability distribution means for computing a conditional probability distribution from either the given input samples or the given output samples in accordance with the probability density function determined by said inference means; and
 d) output means for obtaining an inference value based on the conditional probability distribution from said conditional probability distribution means and for outputting said inference value;
 wherein:
  1) a set of outputs and a probability of occurrence for each one of the outputs are determined for a given input, a probability density to determine the probability of occurrence being approximated by a linear combination of predetermined exponential functions according to a prescribed probability distribution function and being learned repeatedly using the prescribed maximum likelihood method; and
  2) when the probability of occurrence for the given input is obtained, a determination is made whether the given input is known or unknown based on said probability of occurrence for the given input.

13. A neural network learning system for inferring an input-output relationship from a set of given input and output samples, comprising:
 a) probability density means for determining a probability density on a sum space of an input space and an output space from the set of given input and output samples by learning a value of a parameter through a prescribed maximum likelihood method;
 b) inference means for determining a probability density function based on the probability density from said probability density means, to infer the input-output relationship of the samples from the probability density function; wherein the learning a value of the parameter is repeated by said inference means until a value of a predefined parameter differential function using the prescribed maximum likelihood method is smaller than a prescribed value, thereby determining said parameter value;
 c) conditional probability distribution means for computing a conditional probability distribution from either the given input samples or the given output samples in accordance with the probability density function determined by said inference means; and d) output means for obtaining an inference value based on the conditional probability distribution from said conditional probability distribution means and for outputting said inference value;

wherein an inference value for each of a set of outputs and a variance of the inference values are determined by said learning performed based on the probability density on the sum space for the given input and output samples.

14. A neural network learning system according to claim 13, wherein said probability density is defined to have a first parameter w1 used to determine the inference value and a second parameter w2 used to determine the variance of the inference value, and wherein the learning of each of the parameters w1 and w2 is repeated until the sum of squares of values of a predefined parameter differential function using a prescribed maximum likelihood method with respect to the first and second parameters is smaller than a prescribed reference value so as to determine values of the first and second parameters, thereby the inference value and the variance thereof are determined.

15. A neural network learning system according to claim 14, wherein said probability density is derived from the linear combination of exponential functions $\exp(-(y-\phi(w2, x))/\sigma(w1, x))^2)$ with respect to the given inputs x and outputs y where $\phi$ is a function indicating a relationship between x and y.

16. A neural network learning system according to claim 15, wherein a function $\sigma(w1, x)$ of said exponential function is derived from a linear combination of Gaussian type exponential functions.

17. A neural network learning system according to claim 14, wherein a tolerance of the inference value at a given critical factor that satisfies a required condition is output based on an output of an average function, defined to have the second parameter w2, and an output of a variance function, defined to have the first parameter w1.

18. A neural network learning system in which an input-output relationship for a set of input and output samples is predetermined, said system comprising:

a) output probability means for determining output probabilities for given inputs in accordance with probability distributions on a sum space of an input space and an output space; and b) parameter learning means for carrying out a learning of parameters, the parameters respectively defining the probability distributions of said output probability means, wherein said parameter learning means includes:

1) clustering means for classifying the given data on the sum space into a set of clusters to determine statistical quantities of data in each of the clusters, and 2) parameter computing means for determining values of the parameters for the probability distributions of the output probability means based on the statistical quantities of the data from the clustering means.

19. A neural network learning system according to claim 18, wherein said parameter computing means determines the values of the parameters for the probability distributions, each parameter having an average of each probability distribution, a variance thereof and a coefficient of the linear combinations, the values of said parameters being determined by said parameter computing means based on the statistical quantities of the data in each of the clusters, said parameter learning means supplying said values of said parameters to said output probability means.

20. A neural network learning system according to claim 19, wherein a number of clusters in said clustering means accords with the number of the linear combinations of probability distributions used in the output probability means.

21. A neural network learning system according to claim 20, wherein said clustering means carries out the classifying of the given data into clusters using a prescribed non-hierarchical classifying method, and the number of linear combinations of probability distributions used in said output probability means is predetermined as being the same as the number of clusters from said clustering means.

22. A neural network learning system according to claim 20, wherein said clustering means carries out the classifying of the given data into clusters using a hierarchical classifying method, and the number of clusters in said clustering means is determined at the end of said classifying, the number of linear combinations of probability distributions used in said output probability means being determined as being the same as said number of clusters.

23. A neural network learning system according to claim 18, wherein said parameter learning means comprises:

initializing means for obtaining initial values of the parameters from said clustering means and storing the initial values of the parameters in a storage part of the output probability means; and updating means for updating the parameters by performing an inference process using a prescribed maximum likelihood method, starting from the initial values of the parameters stored in the storage part, so that optimal values of the parameters are determined.

24. A data analyzing device used in the neural network learning system according to claim 22 for performing a clustering of a set of given data, said device comprising:

classifying means for classifying data, stored in a first storage part, into a set of clusters in accordance with a prescribed probability distribution with respect to data included in each cluster so as to allocate the given data to the clusters;

initializing means for determining initial values of parameters from the data in the first storage part, each of said parameters including an average, a standard deviation, and a coefficient to define the probability distribution of the data for each cluster, and said initial values of the parameters being stored in a second storage part; and parameter updating means for updating said parameters in said second storage part for each cluster each time the given data is allocated by said classifying means to the clusters, wherein the data is repeatedly classified by said classifying means into a set of clusters in accordance with a probability distribution based on said parameters in said second storage part each time said parameters are updated by said parameter updating means.

25. A data analyzing device according to claim 24, further comprising convergence discriminating means for detecting whether or not a prescribed convergence criterion is satisfied by the parameters being updated, wherein said convergence discriminating means instructs said parameter updating means to stop the updating of the parameters when the convergence criterion is satisfied.

26. A data analyzing device according to claim 25, wherein said convergence discriminating means computes a change in the parameters from the sum of squares of weighted errors of the parameters previously stored in the second storage part to the sum thereof obtained from the parameters after the updating is performed, and instructs said parameter updating means to stop the updating of the parameters when it is detected that the change is smaller than a prescribed threshold value.

27. A data analyzing device according to claim 25, wherein said convergence discriminating means increments a count each time the updating of the parameters is performed, and instructs said parameter updating means to stop the updating of the parameters when it is detected that the count is greater than a prescribed value.

* * * * *

UNITED STATES PATENT AND TRADEMARK OFFICE
CERTIFICATE OF CORRECTION

PATENT NO. : 5,479,576

DATED : December 26, 1995

INVENTOR(S) : Sumio WATANABE et al.

It is certified that error appears in the above-indentified patent and that said Letters Patent is hereby corrected as shown below:

On the title page, item [54] and Col. 1, line 1
In the Title, insert --FOR-- after "SYSTEM";

At column 7, formula (11), delete the existing formula and insert the following:

$$dw_1 = -\sum_i (\partial R(w_1, x_i)/\partial w_1)$$

$$dw_2 = -\sum_i \partial \{ \|y_i - \phi(w_2, x_i)\|^2 \}/\partial w_2)$$

At column 8, delete the existing formula (13) and insert the following:

$$P(w; x,y) = \sum_{h-1}^{H} \exp\{-\|x - x_h\|^2 - \|y - y_h\|^2 - \theta_h\}$$

At column 8, delete the existing formula (14) and insert the following:

$$P(w; y/x) = \frac{\sum \exp\{-\|x - x_h\|^2 - \|y - y_h\|^2 - \theta_h\}}{\sum \sqrt{2\pi} \cdot \exp\{-\|x - x_h\|^2 - \theta_h\}}$$

UNITED STATES PATENT AND TRADEMARK OFFICE
CERTIFICATE OF CORRECTION

PATENT NO. : 5,479,576    Page 2 of 5

DATED : December 26, 1995

INVENTOR(S) : Sumio WATANABE et al.

It is certified that error appears in the above-indentified patent and that said Letters Patent is hereby corrected as shown below:

At columns 8 and 9, delete the existing formula (15) and insert the following:

$$d\theta_h = -\sum_h \frac{\exp\{-\|x - x_h\|^2 - \|y - y_h\|^2 - \theta_h\}}{P(w; x,y)}$$

$$dx_h = -\sum_h \frac{(x_h - x)\exp\{-\|x - x_h\|^2 - \|y - y_h\|^2 - \theta_h\}}{P(w; x,y)}$$

$$dy_h = -\sum_h \frac{(y_h - y)\exp\{-\|x - x_h\|^2 - \|y - y_h\|^2 - \theta_h\}}{P(w; x,y)}$$

At column 9, delete the existing formula (18) and insert the following:

$$P(w; y/x) = \sum_{h-1}^{H} (O_h/S) \cdot \exp(-\|y - y_h\|^2)$$

At column 10, delete the existing formula (19) and insert the following:

$$P(w; x,y) = \sum_{h-1}^{H} \exp\{-\|x - x_h\|^2 - \|y - \phi(w_h, x)\|^2 - \theta_h\}$$

UNITED STATES PATENT AND TRADEMARK OFFICE
CERTIFICATE OF CORRECTION

PATENT NO. : 5,479,576
DATED : December 26, 1995
INVENTOR(S) : Sumio WATANABE et al.

It is certified that error appears in the above-indentified patent and that said Letters Patent is hereby corrected as shown below:

At column 10, delete the existing formula (20) and insert the following:

$$P(w; y/x) = \frac{\sum \exp\{-\|x - x_h\|^2 - \|y - \phi(w_h, x)\|^2 - \theta_h\}}{\sum \sqrt{2\pi} \cdot \exp\{-\|x - x_h\|^2 - \theta_h\}}$$

At column 11, delete the existing formula (21) and insert the following:

$$P(w_1, w_2; x, y) = \frac{R'(w_1; x)}{(2\pi\sigma^2)^{N/2}} \cdot \exp\left\{-\frac{\|y - \phi(w_2; x)\|^2}{2\sigma^2}\right\}$$

At column 11, delete the existing formula (22) and insert the following:

$$R'(w_1; x) = \frac{1}{Z(\theta)} \sum_{h-1}^{H} \frac{1}{(2\pi\sigma_h)^2} \cdot \exp\left\{-\frac{\|x - x_h\|^2}{2\sigma_h^2} + \theta_h\right\}$$

$$Z(\theta) = \sum \exp(\theta_h)$$

At column 12, delete the existing formula (25) and insert the following:

$$\frac{dw_2}{dt} = \sum_{i=1}^{S} \frac{\partial}{\partial w_2} \|y_i - \phi(w_2; x_i)\|^2$$

UNITED STATES PATENT AND TRADEMARK OFFICE
CERTIFICATE OF CORRECTION

PATENT NO. : 5,479,576
DATED : December 26, 1995
INVENTOR(S) : Sumio WATANABE et al.

It is certified that error appears in the above-indentified patent and that said Letters Patent is hereby corrected as shown below:

At column 12, delete the existing formula (27) and insert the following:

$$S_{hi} = \frac{\exp\{-\|x_i - x_h\|^2/(2\sigma_h^2) + \theta_h\}}{R(w_1; x) Z(\theta) (2\pi\sigma_h^2)^{N/2}}$$

$$N_{hi} = \|x_i - x_h\|^2/(2\sigma_h^2)$$

At column 13, line 14, delete the first occurrence of the word "the";

At column 14, line 4, delete "o(w1; x)" and insert --φ(w1; x)--;

At column 14, delete the existing formula (31) and insert the following:

$$dw_2 = -(1/\sigma(w_1, x_i)^2)[(\partial/\partial w_2)(y_i - \phi(w_2, x_i))^2]$$

At column 14, line 35, delete "o(w1; x)" and insert --φ(w1; x)--;

At column 18, line 7, delete "w=(Ch, σn, mh)" and insert --w=(Ch, σh, mh)--;

UNITED STATES PATENT AND TRADEMARK OFFICE
CERTIFICATE OF CORRECTION

PATENT NO. : 5,479,576

DATED : December 26, 1995

INVENTOR(S) : Sumio WATANABE et al.

It is certified that error appears in the above-indentified patent and that said Letters Patent is hereby corrected as shown below:

At column 18, delete the exising formula (41) and insert the following:

$$E = \sum_{h=1}^{H} E_h$$

$$E_h = \sum_{v=1}^{nh} \|x_{h,v} - (x_h)_m\|^2$$

At column 30, in the second line of claim 24, delete "22" and insert --18--.

Signed and Sealed this

Nineteenth Day of November, 1996

Attest:

BRUCE LEHMAN

Attesting Officer     Commissioner of Patents and Trademarks